US012754037B2

(12) United States Patent
Wang

(10) Patent No.: US 12,754,037 B2
(45) Date of Patent: Oct. 6, 2026

(54) MAP DISPLAY METHOD AND RELATED DEVICE

(71) Applicant: Huawei Technologies Co., Ltd., Shenzhen (CN)

(72) Inventor: Bingheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 18/556,122

(22) PCT Filed: Apr. 7, 2022

(86) PCT No.: PCT/CN2022/085582
§ 371 (c)(1),
(2) Date: Aug. 1, 2024

(87) PCT Pub. No.: WO2022/222761
PCT Pub. Date: Oct. 27, 2022

(65) Prior Publication Data

US 2025/0321115 A1 Oct. 16, 2025

(30) Foreign Application Priority Data

Apr. 19, 2021 (CN) ........................ 202110419782.2

(51) Int. Cl.
*G01C 21/36* (2006.01)
*A63B 24/00* (2006.01)
*G01C 21/34* (2006.01)

(52) U.S. Cl.
CPC ........ *G01C 21/367* (2013.01); *A63B 24/0021* (2013.01); *A63B 24/0075* (2013.01); *G01C 21/3453* (2013.01); *G01C 21/3676* (2013.01); *A63B 2024/0025* (2013.01)

(58) Field of Classification Search
CPC .............. G01C 21/367; G01C 21/3453; G01C 21/3676; G01C 21/3484; G01C 22/006; A63B 24/0021; A63B 24/0075; A63B 2024/0025; G01S 19/45; G06Q 10/04;
(Continued)

(56) References Cited

U.S. PATENT DOCUMENTS

2007/0156335 A1* 7/2007 McBride ............ G01C 21/3423
340/995.19
2012/0143497 A1* 6/2012 Van Hende ........ G01C 21/3484
701/439
2015/0238815 A1 8/2015 Lee
(Continued)

FOREIGN PATENT DOCUMENTS

CN 102538791 A 7/2012
CN 104122994 A 10/2014
(Continued)

OTHER PUBLICATIONS

Machine Translation of CN108088457A (Year: 2018).*

*Primary Examiner* — Sahar Motazedi
(74) *Attorney, Agent, or Firm* — Conley Rose, P.C.

(57) ABSTRACT

A map display method includes: displaying a first control; inputting a first operation for the first control; receiving the first operation that is input for the first control; displaying a map interface in response to the first operation; and performing navigation based on a received target route selected in the displayed map interface.

20 Claims, 14 Drawing Sheets

(58) Field of Classification Search
CPC ....... G06Q 10/047; G06F 16/29; G06F 16/23; G06F 16/287
See application file for complete search history.

(56) References Cited

U.S. PATENT DOCUMENTS

| | | | | |
|---|---|---|---|---|
| 2016/0370198 | A1 | 12/2016 | Baughman et al. | |
| 2016/0375306 | A1* | 12/2016 | Gu | G01S 19/42 701/430 |
| 2017/0307400 | A1* | 10/2017 | Adachi | G01C 21/3469 |
| 2019/0178661 | A1* | 6/2019 | Sakaida | G01C 21/20 |
| 2019/0366156 | A1* | 12/2019 | Tang | A63B 24/0062 |
| 2020/0072626 | A1* | 3/2020 | Kumar | B60L 53/32 |

FOREIGN PATENT DOCUMENTS

| | | | |
|---|---|---|---|
| CN | 108088457 | A | 5/2018 |
| CN | 108133739 | A | 6/2018 |
| CN | 109427413 | A | 3/2019 |
| JP | 2004109100 | A | 4/2004 |
| WO | 2016193856 | A1 | 12/2016 |

* cited by examiner

MAP DISPLAY METHOD AND RELATED DEVICE

CROSS-REFERENCE TO RELATED APPLICATIONS

This is a U.S. National Stage of International Patent Application No. PCT/CN2022/085582 filed on Apr. 7, 2022, which claims priority to Chinese Patent Application No. 202110419782.2 filed on Apr. 19, 2021, both of which are hereby incorporated by reference in their entireties.

TECHNICAL FIELD

This application relates to the field of terminal technologies, and in particular, to a map display method and a related device.

BACKGROUND

As people attach greater importance to health, a growing quantity of users consider exercise as a part of daily life. A user usually uses an exercise application installed on a terminal device to customize an exercise plan or record an exercise status. For example, the user may obtain exercise expenditure information of physical energy during or after an exercise by using the exercise application, to plan an exercise route.

In some existing exercise route planning methods, for example, when the user plans an exercise route of an outdoor exercise (for example, running), if the user wants to obtain exercise expenditure information of physical energy, the user may input a starting point and an end point on an electronic map, and the terminal device may calculate, based on the exercise route connecting the starting point and the end point, calories to be consumed by the user during an exercise in the exercise route.

However, the foregoing method for obtaining exercise expenditure information of physical energy is cumbersome and is unfavorable for a user to plan an exercise route, causing poor user experience.

SUMMARY

Embodiments of this application disclose a map display method and a related device, to resolve the technical problem that in a conventional technology, a method for obtaining exercise expenditure information of physical energy is complex and is unfavorable for a user to plan an exercise route. An exercise expenditure displayed in the method is intuitive, and the user may directly select or plan a route based on the displayed exercise expenditure. An operation is simple, and resource consumption of an electronic device for running an application is reduced.

According to a first aspect, an embodiment of this application provides a map display method. The method includes the following steps.

An electronic device displays a first control of a first application, where the first control is used for triggering map planning based on an exercise expenditure; the electronic device receives a first operation that is input for the first control; and the electronic device displays a map interface in response to the first operation, where the map interface includes at least one planned target location and one or more exercise routes from a starting point to each target location, the target location is a location determined based on basic expenditure efficiency of a current exercise of a first object (also referred to as a user), a maximum expenditure of a single exercise of the first object, and map information around the starting point, and the exercise route displays a change of an exercise expenditure from the starting point to the target location.

According to the method provided in the first aspect, the electronic device receives the first operation for the first control that is used for triggering map planning based on the exercise expenditure, and displays the map interface. The exercise route included in the map interface displays the change of the exercise expenditure from the starting point to the target location, and provides intuitive exercise expenditure information of each exercise route for the user. This resolves the technical problem that, in a conventional technology, a method for obtaining exercise expenditure information of physical energy is complex and is unfavorable for the user to plan an exercise route. The user may directly select or plan an exercise route in the map interface based on an exercise expenditure requirement of the user. An operation is simple, and resource consumption of the electronic device for running an application is reduced.

With reference to the first aspect, in some embodiments, each exercise route is divided into a plurality of route segments, and different route segments in a same exercise route correspondingly display different exercise expenditures.

In this embodiment of this application, each exercise route in the map interface displayed by the electronic device is divided into the plurality of route segments. Different route segments indicate different exercise expenditures. In other words, one route segment represents a range of one exercise expenditure. Clear exercise expenditure information can be provided for the user. The user may better plan an exercise route based on a target exercise expenditure of the user and an exercise expenditure range indicated by each route segment.

With reference to the first aspect, in some embodiments, each exercise route is divided into the plurality of route segments, and the different route segments in the same exercise route are distinguished in any one of the following display forms: a color, a line type, a pattern, a thickness, a boundary feature, an endpoint shape, a blur degree, and transparency.

In this embodiment of this application, the different route segments in the same exercise route are distinguished in any one of the foregoing display forms, so that more obvious prompt information of the exercise expenditure can be provided for the user.

With reference to the first aspect, in some embodiments, the same exercise route is displayed in a gradient form, the gradient form is any one of the following display forms: a color gradient and a transparency gradient, and the gradient form is used for displaying a change of an exercise expenditure.

In this embodiment of this application, the same exercise route is marked in the foregoing color gradient or transparency gradient display form, and the exercise route in the map interface is processed and displayed based on a relationship between a gradient degree (indicating a color change degree or a transparency change degree) and a change degree of an exercise expenditure. The gradient form provides the user with more vivid exercise expenditure information, so that the user can plan an exercise route based on the information.

With reference to the first aspect, in some embodiments, the map interface further displays an equal exercise expenditure line, and the equal exercise expenditure line is a closed curve formed by connecting locations at which exercise expenditures from the starting point are the same.

In this embodiment of this application, the map interface may display a location in a region (or an annular region) enclosed by each equal exercise expenditure line (or every two equal exercise expenditure lines) and an exercise expenditure range, to display a relationship between an exercise expenditure and a geographical range. The user may directly select an exercise route based on the relationship and a location that the user wants to pass through. An operation is simple, and resource consumption of the electronic device for running an application can be better reduced. In some specific implementations, when detecting that an exercise direction change of the user in an exercise process is greater than a first threshold, the electronic device may update the equal exercise expenditure line based on a real-time location of the user. In this way, accuracy of the equal exercise expenditure line can be improved.

With reference to the first aspect, in some embodiments, after the displaying a map interface in response to the first operation, the method further includes the following steps.

The electronic device receives an operation that is input for a pass-through node by the first object; and the electronic device displays an updated map interface in response to the operation that is input for the pass-through node, where the updated map interface includes at least one planned target location and one or more exercise routes passing through the pass-through node from the starting point to the target location, the target location is a location that is behind the pass-through node from the starting point and that is determined based on the basic expenditure efficiency of the current exercise of the first object, the maximum expenditure of the single exercise of the first object, and map information around the starting point and the pass-through node, and the exercise route displays a change of an exercise expenditure passing through the pass-through node from the starting point to the target location.

In this embodiment of this application, the user may select, in the map interface, the location that the user wants to pass through, and may touch a corresponding location in the map interface. After receiving the operation of the user for selecting the pass-through node, the electronic device updates the map interface. The updated map interface includes the one or more exercise routes passing through the pass-through node from the starting point to the target location. In addition, there may be a plurality of pass-through nodes. Locations and a quantity of pass-through nodes are not limited on an exercise route that does not exceed the maximum expenditure of the single exercise. In this way, when the electronic device receives the plurality of pass-through nodes input by the user, a round-trip exercise route may be planned and designed. Each time after receiving an operation for selecting a pass-through node, the electronic device updates the map interface, and an exercise expenditure at any location in the updated map interface is obtained by adding an exercise expenditure from the original starting point to the pass-through node, so that accumulative calculation of the exercise expenditure is ensured. In this way, when performing calculation at a location behind the pass-through node from the original starting point, the electronic device does not need to recalculate the exercise expenditure from the original starting point to the pass-through node, so that resource consumption is reduced.

With reference to the first aspect, in some embodiments, the updated map interface further displays a second equal exercise expenditure line, and the second equal exercise expenditure line is a closed curve formed by connecting locations at which exercise expenditures from the pass-through node are the same.

In this embodiment of this application, after the electronic device receives the operation for selecting the pass-through node, the equal exercise expenditure line included in the displayed updated map interface may provide information of an exercise expenditure from the pass-through node to a location around the pass-through node, namely, a relationship between an increased exercise expenditure from the pass-through node and a geographical range around the pass-through node, to provide more intuitive information for the user. In some embodiments, the equal exercise expenditure line displays a value of an exercise expenditure corresponding to the equal exercise expenditure line.

With reference to the first aspect, in some embodiments, the method further includes: displaying a warning icon at the target location in the map interface, where the warning icon is used for warning the first object of excessive exercise beyond the target location in the exercise route.

In this embodiment of this application, based on the maximum expenditure that is of the single exercise and that is set by the user, the electronic device may display an exercise region in which the user consumes the maximum expenditure of the single exercise. The warning icon is displayed at a location or a region (namely, the exercise region in which an expenditure exceeds the maximum expenditure of the single exercise) beyond the target location. The warning icon may be displayed to remind the user to pay attention to the exercise expenditure during the single exercise or planning of the single exercise, to avoid situations such as excessive fatigue, exercise injury, or harm to health.

With reference to the first aspect, in some embodiments, the possible implementation of the displaying a map interface in response to the first operation may be: The electronic device determines exercise expenditures from the starting point to a plurality of nodes based on the basic expenditure efficiency of the current exercise of the first object (also referred to as the user) and the map information around the starting point; determines, based on the exercise expenditures from the starting point to the plurality of nodes and the maximum expenditure of the single exercise of the first object, at least one target location at which the maximum expenditure of the single exercise from the starting point is reached; determines one or more exercise routes from the starting point to the at least one target location; and displays the one or more exercise routes in an electronic map.

In this embodiment of this application, the basic expenditure efficiency of the current exercise of the user is determined by the electronic device based on obtained personal information of the user and setting information of the current exercise of the user, and personal factors such as a physical condition and an exercise ability of the user are fully considered. In this way, the electronic device can plan an exercise route that is based on the exercise expenditure and that meets a personal condition and requirement of the user. For example, the electronic device predicts, based on the obtained personal information of the user, that a recent exercise ability of the user is weaker than an exercise ability of the user in a general situation, and the basic expenditure efficiency of the current exercise is high. When factors such as the maximum expenditure of the single exercise and the starting point are also the same, a planned exercise route is different from an exercise route of the user in a general situation. Therefore, the map display method provided in this embodiment of this application has high flexibility in planning an exercise route, and route planning can be performed for different users and different statuses of a same user. In addition, the electronic device determines the one or more exercise routes from the starting point to the at least one target location based on the basic expenditure efficiency of the current exercise of the user, the map information around the starting point, and the maximum expenditure of the single exercise of the user. These exercise routes are displayed in the map interface, and a plurality of exercise routes are provided for the user to select.

With reference to the first aspect, in some embodiments, the map information around the starting point includes a distance, a slope degree, a slope distribution, a road surface quality, and a traffic condition of the routes from the starting point to the plurality of nodes.

In this embodiment of this application, the electronic device determines the exercise expenditure from the starting point to the plurality of nodes based on the basic expenditure efficiency of the current exercise and the map information around the starting point, and various environmental factors in the exercise region from the starting point of the user are fully considered. In this way, the calculated exercise expenditure is more accurate, and an exercise route that meets a requirement of the user can be planned for the user.

With reference to the first aspect, in some embodiments, the exercise expenditure is measured in any one of the following measurement manners: a calorie expenditure, a heat expenditure, an energy substance expenditure, a weight loss, a sugar expenditure, a fat expenditure, an exercise amount score, and an exercise task target percentage.

In this embodiment of this application, the exercise expenditure may be measured in any one of the foregoing measurement manners, and different measurement manners may indicate different exercise expenditure indicators, to provide various choices for the user. In some embodiments, the user may select a measurement manner based on a requirement. For example, the user sets the calorie expenditure as a measurement manner of the exercise expenditure.

With reference to the first aspect, in some embodiments, after the displaying a map interface in response to the first operation, the method further includes the following steps.

The electronic device receives a second operation that is input for a selection control for a route in the map interface, where the selection control is used for selecting a target route; displays the selected target route in response to the second operation; and performs navigation based on the target route.

In this embodiment of this application, the electronic device may perform navigation for the selected target route in response to the received operation that is input by the user for the selection control for the route, so that the user may be navigated to take exercise along the target route, to complete a target exercise expenditure of the user without exceeding the maximum expenditure of the single exercise.

With reference to the first aspect, in some embodiments, the method further includes the following step.

When detecting that a current location of the first object deviates from the target route, the electronic device updates the map interface by using the current location as a pass-through node.

In this embodiment of this application, when detecting that the user deviates from the target route, the electronic device may update the map interface. In this way, after the update, the map interface may provide the user with information of an exercise expenditure from a current location and a feasible exercise route, to ensure that an exercise expenditure along the feasible exercise route does not exceed the maximum expenditure of the single exercise. When the user deviates from the route, the exercise route in the map interface can still be temporarily adjusted, to avoid that the user continues to take exercise after the user deviates from the target route, and suffers excessive fatigue or a higher injury risk caused when the exercise expenditure exceeds the maximum expenditure of the single exercise.

With reference to the first aspect, in some embodiments, before the displaying a map interface, the method further includes the following step.

The electronic device receives the maximum expenditure that is of the single exercise and that is input by the user.

In this embodiment of this application, the maximum expenditure of the single exercise may be set by the user based on a physical condition, an exercise ability, and the like of the user. In this way, the electronic device can fully combine a requirement of the user on the exercise expenditure of the current exercise, so that user experience is improved, and accuracy and pertinence of exercise route planning of the electronic device can be improved.

According to a second aspect, an embodiment of this application provides an electronic device, including one or more processors and one or more memories. The one or more memories are respectively coupled to the one or more processors. The one or more memories are configured to store computer program code. The computer program code includes computer instructions.

The processor is configured to invoke the computer instructions to perform the map display method according to any one of the first aspect and the possible implementations of the first aspect.

According to a third aspect, an embodiment of this application provides a computer storage medium, including computer instructions. When the computer instructions are run on an electronic device, the electronic device is enabled to perform the map display method according to any one of the first aspect and the possible implementations of the first aspect.

It may be understood that both the electronic device provided in the second aspect and the computer-readable storage medium provided in the third aspect are configured to perform the map display method according to any one of the first aspect and the possible implementations of the first aspect. Therefore, for beneficial effects that can be achieved by the method, refer to beneficial effects in the corresponding method. Details are not described herein again.

DESCRIPTION OF EMBODIMENTS

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that the term "and/or" used in this application indicates and includes any or all possible combinations of one or more listed items.

In embodiments of this application, an electronic device may be a terminal having a display function. The terminal may include but is not limited to various user terminals such as a smartphone, a notebook computer, a personal computer, a personal digital assistant, a mobile Internet device, and an intelligent wearable device (such as a smartwatch or a smart band). Alternatively, the electronic device may be a server that has and generates a map for displaying an exercise expenditure provided in embodiments of this application.

In embodiments of this application, the exercise expenditure may be any one of other measurement units that may indicate the exercise expenditure, such as a calorie expenditure, a heat expenditure, an energy substance expenditure, a weight loss, a sugar expenditure, a fat expenditure, an exercise amount score, and an exercise task target percentage. This is not limited in this embodiment of this application.

Figure 1:
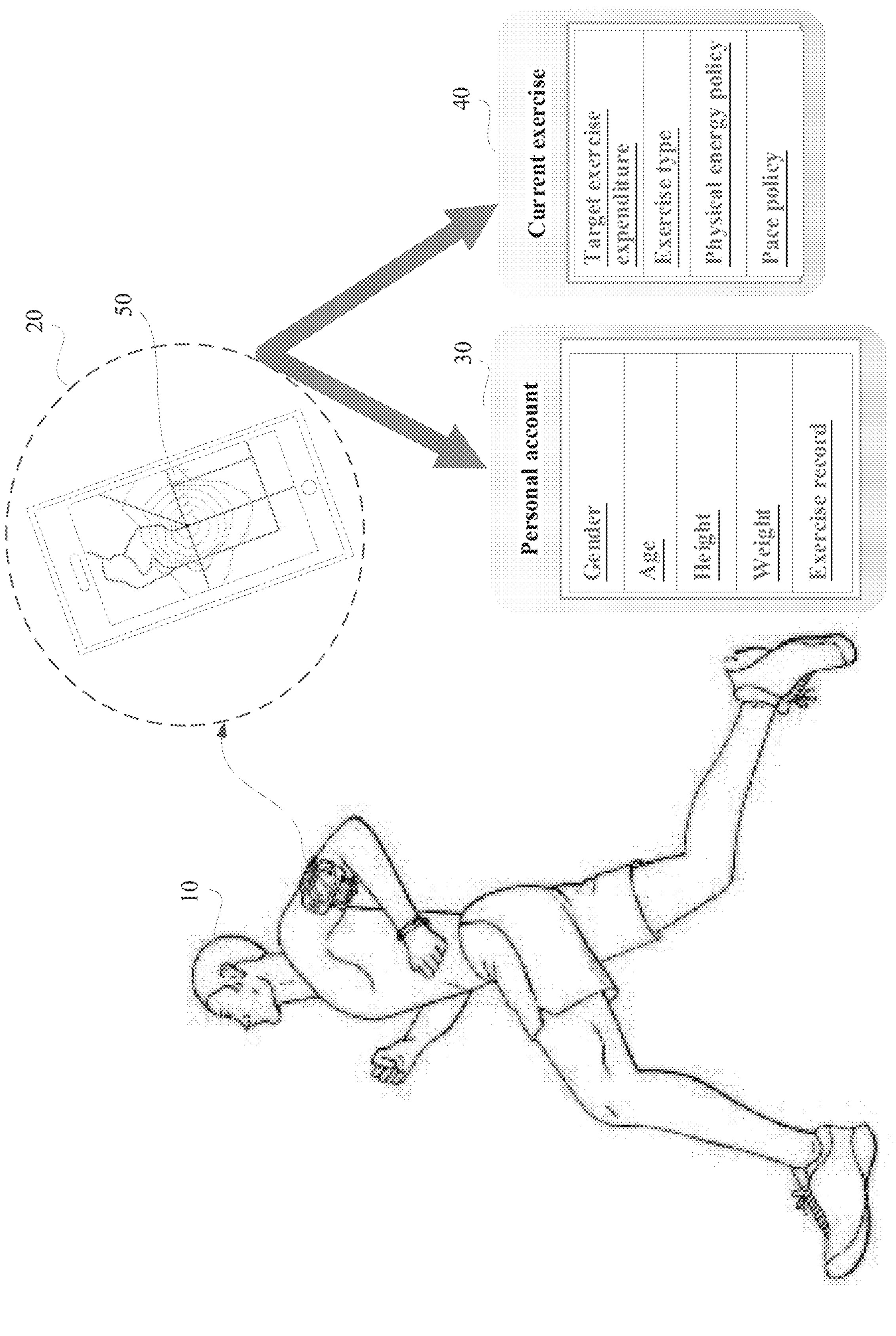
FIG. 1 is a schematic diagram of an application scenario of a map display method according to an embodiment of this application.

The following first describes an application scenario in embodiments of this application. FIG. 1 is a schematic diagram of an application scenario of a map display method according to an embodiment of this application. As shown in FIG. 1, a user (also referred to as a first object in this embodiment of this application) 10 plans to take exercise outdoors, and may plan a route of a current exercise by using an application (also referred to as a first application) installed on a terminal device 20 based on a physical condition, an exercise type, a physical energy policy, and the like of the user. The application installed on the terminal device 20 may be an exercise application having a map display and navigation function, or may be an electronic map application. The terminal device 20 may be configured to display an interface 30. The interface 30 may include personal information of the user 10, for example, a gender, an age, a height, a weight, an exercise record, an exercise ability, an exercise skill level, a historical exercise expenditure evaluation value, a recent fatigue degree, and a recent sleep quality. The personal information of the user 10 may be obtained by the terminal device 20 from the Internet or local data, or may be input by the user 10. The personal information of the user 10 may be used to evaluate personal basic expenditure efficiency of the user 10. The terminal device 20 may be further configured to display an interface 40. The interface 40 may be a setting interface of the current exercise, and may include a target exercise expenditure, an exercise type, a physical energy policy, a pace policy, and the like of the current exercise. The interface 40 may include parameter selection controls for indicators of the current exercise or parameter input boxes for indicators shown in FIG. 1. The target exercise expenditure may be a target expenditure of the current exercise or a current day exercise. The exercise type may be selected and set to one of running, walking, cycling, mountain climbing, and the like. The physical energy policy may be an expenditure per unit time, or the like. The pace policy may be an exercise pace selected or input by the user.

After completing the setting of the current exercise, the user 10 may perform a first operation that is input for the first control, where the first control triggers map planning based on the exercise expenditure. After receiving the first operation, the terminal device 20 displays a map interface in response to the first operation, for example, an interface 50 in FIG. 1. The map interface includes at least one planned target location and one or more exercise routes from a starting point to each target location. The target location is a location determined based on basic expenditure efficiency of the current exercise of the user 10, a maximum expenditure of a single exercise, and map information around the starting point. The exercise route displays a change of an exercise expenditure from the starting point to the target location. It should be understood that the basic expenditure efficiency of the current exercise of the user 10 may be determined by the terminal device 20 based on the personal basic expenditure efficiency of the user 10 and information such as the exercise type and the pace policy of the current exercise of the user 10. The maximum expenditure of the single exercise may be input by the user 10 on the terminal device 20, or may be calculated by the terminal device based on information such as the personal information and the exercise record of the user 10. In some embodiments, the change that is displayed in the exercise route and that is of the exercise expenditure from the starting point to the target location may be represented by using one of the following: a color, transparency, a blur degree, a pattern, a boundary feature, a line thickness, a line endpoint shape, a line type, and the like.

In some embodiments, the map interface may further display an equal exercise expenditure line, and the equal exercise expenditure line is a closed curve formed by connecting locations at which exercise expenditures from the starting point are the same.

In some embodiments, the user 10 may further select a pass-through node in the map interface in a manner of tap, input, or the like. Each time a pass-through node is selected, the map interface is updated once. Finally, one or more exercise routes passing through the pass-through node from the starting point may be obtained.

In this case, the user 10 may select one of the one or more exercise routes in the map interface as a target route, so that the terminal device 20 displays the target route, and performs navigation based on the target route.

It should be understood that, in some embodiments, when the starting point or an exercise region of the user 10 is in a non-road network environment, for example, a square or open water, grid processing may be performed on the non-road network environment, to plan an exercise route and display a map.

The following describes in detail a map display method provided in embodiments of this application with reference to the accompanying drawings.

Figure 2A:
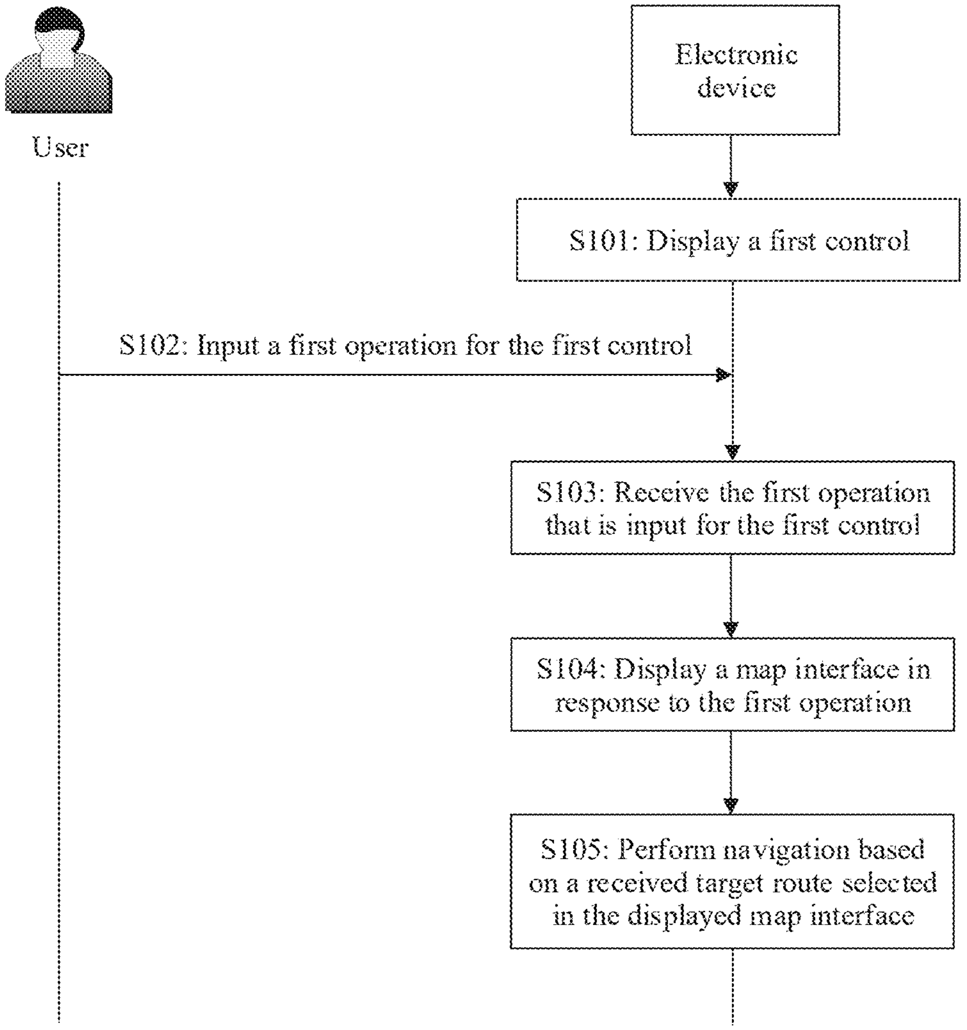
FIG. 2A is a schematic flowchart of a map display method according to an embodiment of this application.

FIG. 2A is a schematic flowchart of a map display method according to an embodiment of this application. The method may be performed by the terminal device 20 shown in FIG. 1. The method may include but is not limited to the following steps.

S101: An electronic device displays a first control by using a display device.

The first control is used to trigger map planning based on an exercise expenditure. A display apparatus may be one of devices such as a display and a projection device. In this embodiment of this application, an example in which the display device is a display of the electronic device is used for description.

Figure 3:
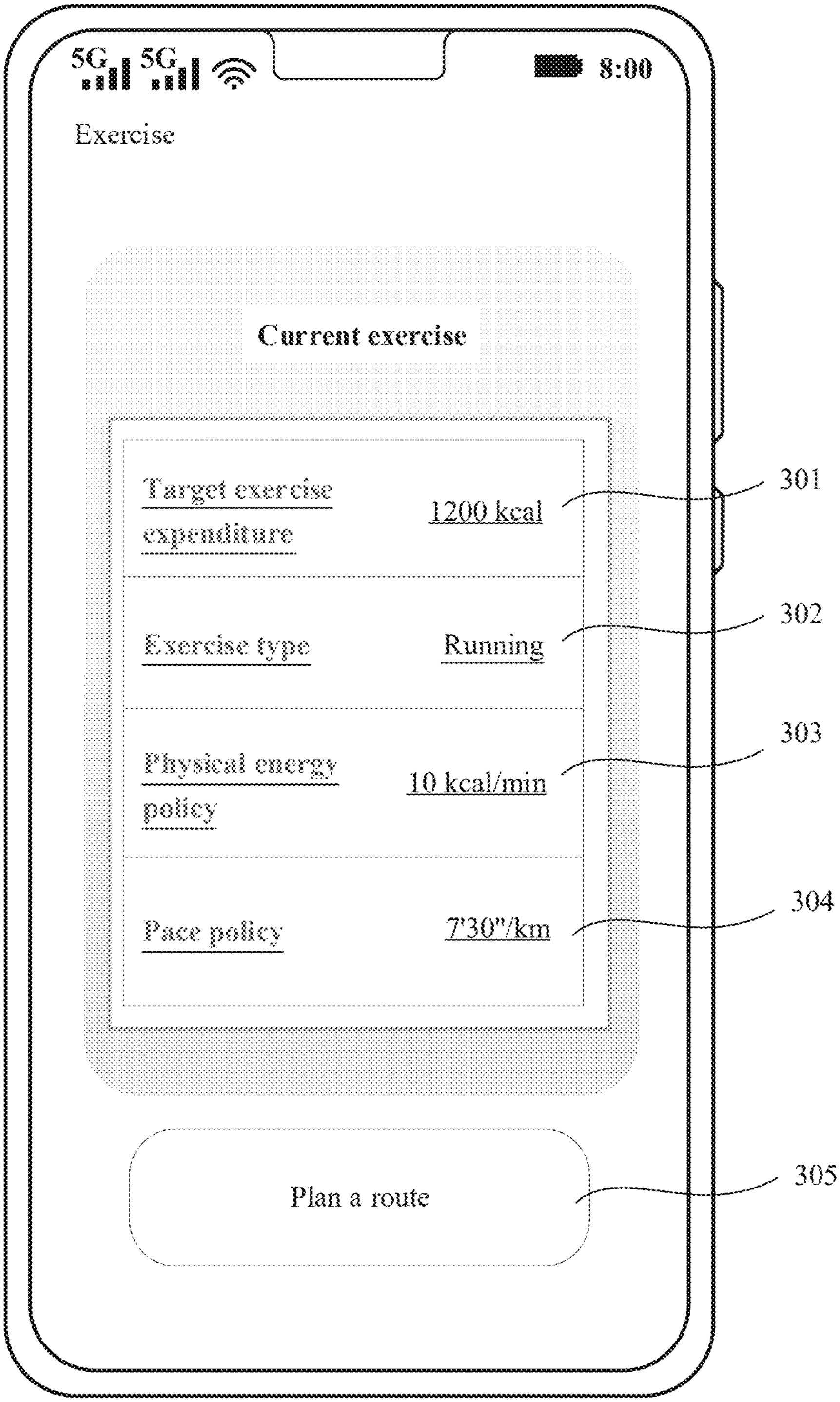
FIG. 3 is a schematic diagram of an interface for setting indicators of a current exercise according to an embodiment of this application.

In some embodiments, FIG. 3 is a schematic diagram of an interface for setting indicators of a current exercise. The interface is used to display a setting entrance for obtaining a current exercise of a user and display the first control that triggers map planning based on the expenditure. The interface may alternatively be the interface 40 in FIG. 1. The interface may include an input or setting entrance for the indicators in the current exercise, for example, a target exercise expenditure 301, an exercise type 302, a physical energy policy 303, and a pace policy 304. The input or setting entrance may be implemented in a manner of keyboard input or touch selection. Setting information that is input for the indicators in the current exercise may be used to determine the basic expenditure efficiency of the exercise of the user. The interface further includes a route planning control 305. The route planning control 305 may be the first control. After receiving the setting information that is of the indicators of the current exercise and that is input by the user, the electronic device may further send prompt information. The prompt information is used to prompt the user to tap the route planning control 305.

S102: The user input a first operation for the first control.

The first operation that is input by the user for the first control may be a touch operation performed by using an input apparatus (for example, a touch-sensitive panel), or may be an audio input, for example, a voice command "Plan a route", collected by using another input apparatus, for example, a microphone. In this embodiment of this application, an example in which a user operation is a touch operation is used to describe the map display method provided in this embodiment of this application.

S103: The electronic device receives the first operation that is input for the first control.

S104: The electronic device displays a map interface in response to the first operation.

The map interface includes at least one planned target location and one or more exercise routes from a starting point to each target location, where "more" means two or more. The target location is a location determined based on basic expenditure efficiency of a current exercise of a first object (the user), a maximum expenditure of a single exercise, and map information around the starting point. The exercise route displays a change of an exercise expenditure from the starting point to the target location. It should be understood that the maximum expenditure of the single exercise needs to be reached from the starting point to the target location. The starting point is a location at which the user starts the current exercise. The location may be a current location that is of the user and that is obtained by the electronic device by using a positioning system, or may be a location selected by the user in the map interface. In some embodiments, the map interface may further display an equal exercise expenditure line and a warning icon.

In a specific implementation, that the exercise route in the map interface displays a change of an exercise expenditure from the starting point to the target location may be implemented in the following two implementations.

Figure 4:
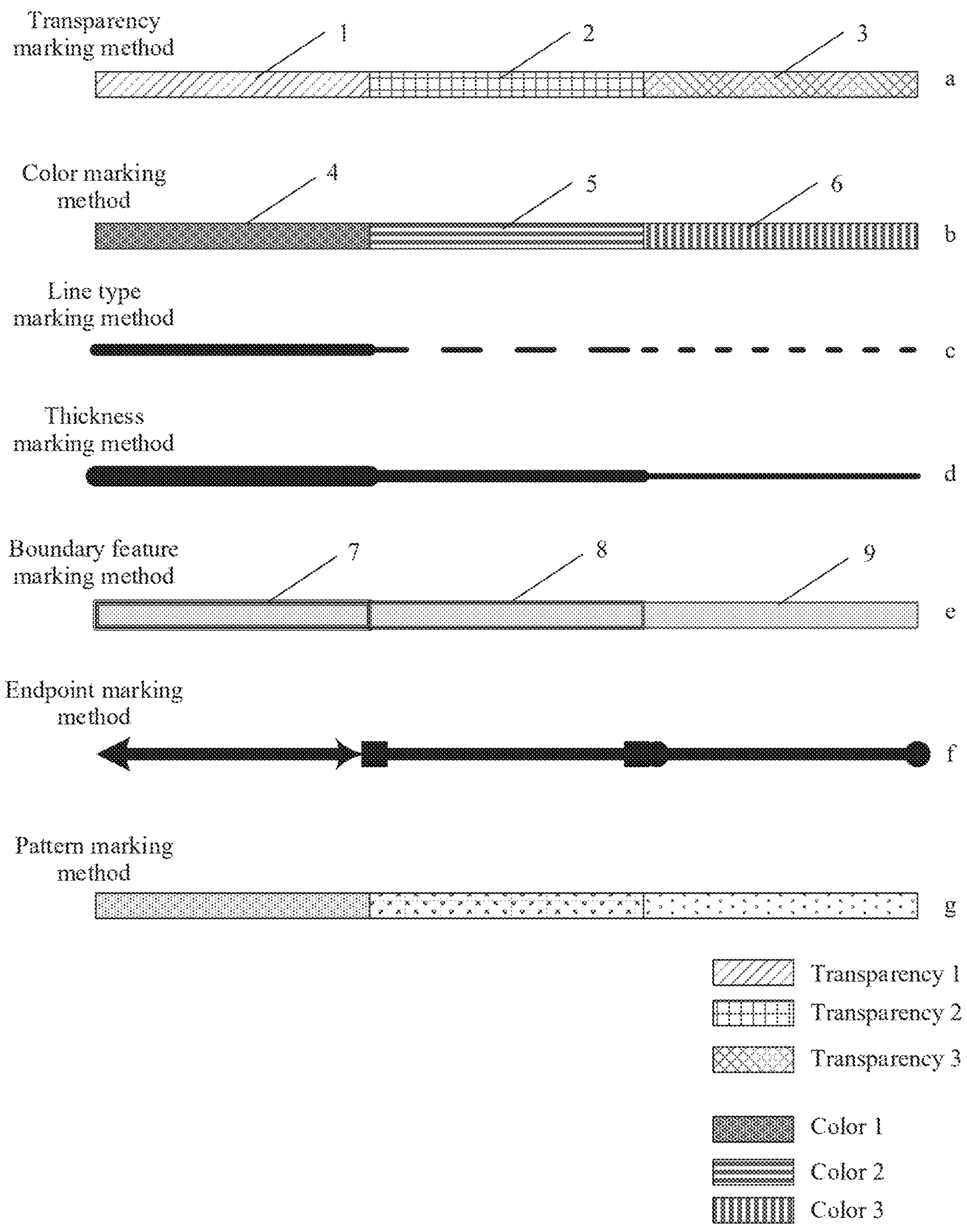
FIG. 4 is a schematic diagram of several exercise route display forms according to an embodiment of this application.

In a first implementation, each exercise route is divided into a plurality of route segments. Different route segments in a same exercise route correspondingly display different exercise expenditures. The different route segments in the same exercise route are distinguished in any one of the following display forms: transparency, a color, a line type, a pattern, a thickness, a boundary feature, an endpoint shape, a blur degree, and the like. For example, the display forms in which the different route segments in the same exercise route correspondingly display the different exercise expenditures are described by using several marking methods shown in FIG. 4. As shown in FIG. 4, the different route segments (different in a same display form) in each marking method respectively correspond to the different exercise expenditures. As shown in FIG. 4, a is an exercise route marked by using a transparency marking method. Transparency of different route segments may be distinguished by transparency degrees 0% to 100% of the route segments. A route segment 1 in the exercise route a is a route segment marked by transparency 1. A route segment 2 is a route segment marked by transparency 2. A route segment 3 is a route segment marked by transparency 3. The transparency 1 corresponds to an exercise expenditure range [x1, x2]. The transparency 2 corresponds to an exercise expenditure range [x2, x3]. The transparency 3 corresponds to an exercise expenditure range [x3, x4]. Each route segment is drawn in this manner, where x1, x2, x3, and x4 are positive numbers. As shown in FIG. 4, b is an exercise route marked by using a color marking method. A route segment 4 is a route segment marked by a color 1. A route segment 5 is a route segment marked by a color 2. A route segment 6 is a route segment marked by a color 3. The color 1 corresponds to the exercise expenditure range [x1, x2]. The color 2 corresponds to the exercise expenditure range [x2, x3]. The color 3 corresponds to the exercise expenditure range [x3, x4]. Similarly, as shown in c and d in FIG. 4, the exercise route may alternatively be marked by using a line type marking method or a thickness marking method. In the exercise route c, different line types (for example, a solid line and a dashed line) indicate different exercise expenditure ranges. In the exercise route d, different line thicknesses indicate different exercise expenditure ranges. A method for marking the different route segments of the same exercise route may alternatively be a boundary feature marking method. The boundary feature may be a boundary color of a route segment. As shown in e in FIG. 4, route segments are marked by different boundary colors. A route segment 7 is a route segment marked by a boundary color 1. A route segment 8 is a route segment marked by a boundary color 2. A route segment 9 is a route segment marked by a boundary color 3. For example, the route segment 7 corresponds to the exercise expenditure range [x1, x2]. The route segment 8 corresponds to the exercise expenditure range [x2, x3]. The route segment 9 corresponds to the exercise expenditure range [x3, x4]. Each route segment is drawn in this manner.

As shown in f in FIG. 4, different route segments in a same exercise route may alternatively be marked by different endpoints, so that each route segment corresponds to one exercise expenditure range. For another example, as shown in g in FIG. 4, different route segments in a same exercise route are marked by different patterns of a same color, so that each route segment corresponds to one exercise expenditure range. In some embodiments, for a same exercise route, an exercise expenditure range (a value range) corresponding to each route segment may be displayed on an upper layer of each route segment, to prompt the user of exercise expenditures of different route segments in the exercise route. In some other embodiments, for a same exercise route, each route segment and an exercise expenditure corresponding to the route segment may be displayed in the map interface in a legend manner, to assist the user in obtaining exercise expenditures of different route segments in the exercise route. A legend may describe content and indicators represented by various symbols and colors in the map interface, and may indicate an exercise expenditure range corresponding to a marking manner of a route segment.

Figure 5:
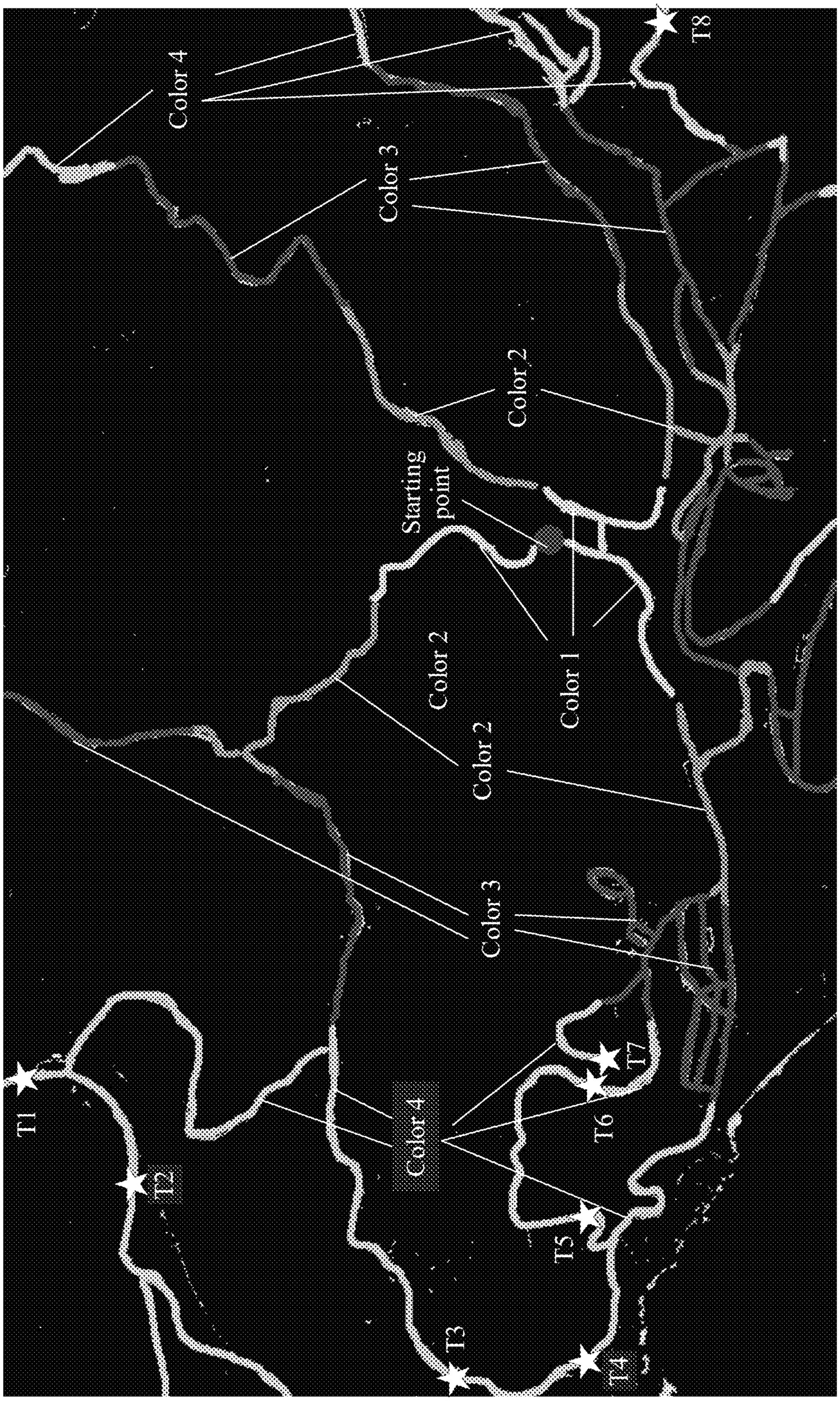
FIG. 5 is a schematic diagram of a map display interface according to an embodiment of this application.

For example, an example in which the different route segments of the same exercise route are distinguished by colors is used to describe a case in which different route segments display different exercise expenditures. As shown in FIG. 5, FIG. 5 shows a plurality of exercise routes that are determined by the electronic device based on the maximum expenditure of the single exercise of the user, the basic expenditure efficiency of the current exercise of the user, and the map information around the starting point and that are from the starting point to a plurality of target locations (T1, T2, T3, T4, T5, T6, T7, and T8). Starting from the starting point in the same exercise route, a color 1 corresponds to an exercise expenditure range, for example, 0-100 kcal, a color 2 corresponds to another exercise expenditure range, for example, 100-200 kcal, and a color 3 corresponds to another exercise expenditure range, for example, 200-300 kcal, until the target location in this manner.

Figure 6:
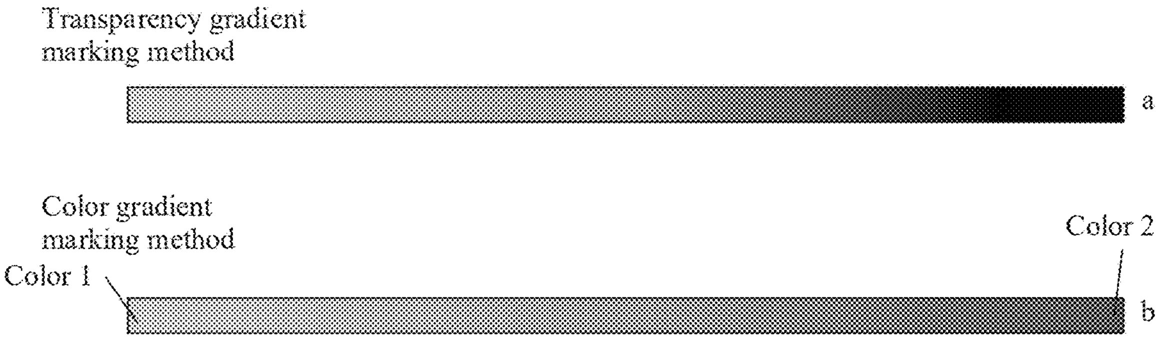
FIG. 6 is a schematic diagram of another several exercise route display forms according to an embodiment of this application.

In a second implementation, each exercise route is displayed in a gradient form. The gradient form may be any one of the following display forms: a color gradient and a transparency gradient. The gradient form of the exercise route correspondingly displays different exercise expenditure, to display the change of the exercise expenditure from the starting point to the target location. As shown in FIG. 6, the exercise route may be displayed by using a transparency gradient marking method in a in FIG. 6. Different transparency of the exercise route may indicate exercise expenditures from the starting point. The transparency gradient may indicate the change of the exercise expenditure in the exercise route. As shown in an exercise route b in FIG. 6, the exercise route may alternatively be displayed by using a color gradient marking method. Different colors of the exercise route may indicate different exercise expenditures from the starting point. A color gradient (for example, from a color 1 to a color 2) may indicate the change of the exercise expenditure in the exercise route. A color 1 indicates that the exercise expenditure is 0, and a color 2 indicates that the exercise expenditure is the maximum expenditure of the single exercise. In some embodiments, a relationship between a gradient degree (indicating a degree of a color change or a transparency change) and a change degree of an exercise expenditure may be established. The electronic device processes and displays the exercise route in the map interface based on the relationship. The gradient form provides more vivid exercise expenditure information for the user, and assists the user in designing and selecting an exercise route based on the information.

Figure 7:
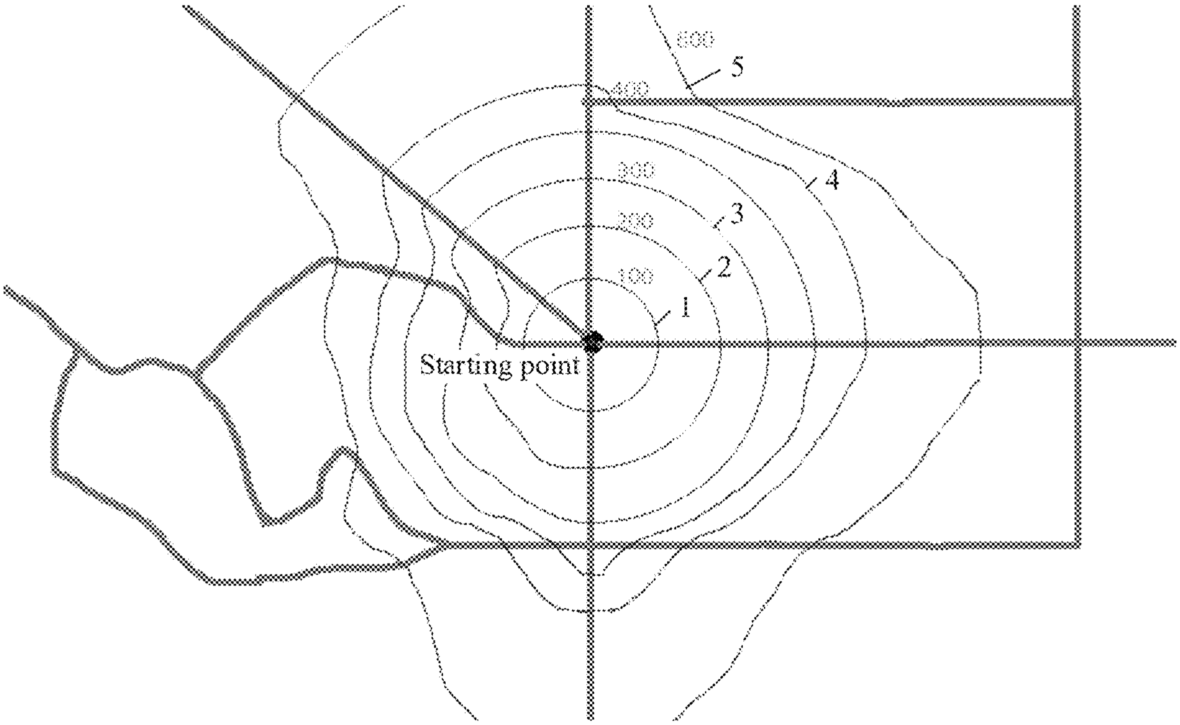
FIG. 7 is a schematic diagram of a display form of an equal exercise expenditure line according to an embodiment of this application.

In some embodiments, the map interface may further display the equal exercise expenditure line. The equal exercise expenditure line is a closed curve formed by connecting locations at which exercise expenditures from the starting point are the same. For example, FIG. 7 is a schematic diagram of a display form of an equal exercise expenditure line, including equal exercise expenditure lines 1, 2, 3, 4, and 5. A process of determining the equal exercise expenditure line may be: determining, based on the basic expenditure efficiency of the current exercise of the user and the map information around the starting point, a location at which a predicted exercise expenditure from the starting point is a first exercise expenditure (for example, 100 kcal), connecting determined locations to form a closed curve (for example, 1 in FIG. 7 is a 100 kcal equal expenditure line), and displaying the closed curve in the map interface. As shown in FIGS. 7, 2, 3, 4, and 5 are equal exercise expenditure lines such as 200 kcal, 300 kcal, 400 kcal, and 600 kcal, respectively. Exercise expenditures to an equal exercise expenditure line along the plurality of exercise routes from the starting point (in an unchanged exercise direction) are the same. The map interface may display a location in a region (or an annular region) enclosed by each equal exercise expenditure line (or every two equal exercise expenditure lines) and an exercise expenditure range, to display a relationship between an exercise expenditure and a geographical range. In some specific implementations, when detecting that an exercise direction change of the user in an exercise process is greater than a first threshold, the electronic device may update the equal exercise expenditure line based on a real-time location of the user. In some embodiments, as shown in FIG. 7, the equal exercise expenditure line may further display an exercise expenditure value corresponding to the equal exercise expenditure line.

Figure 8:
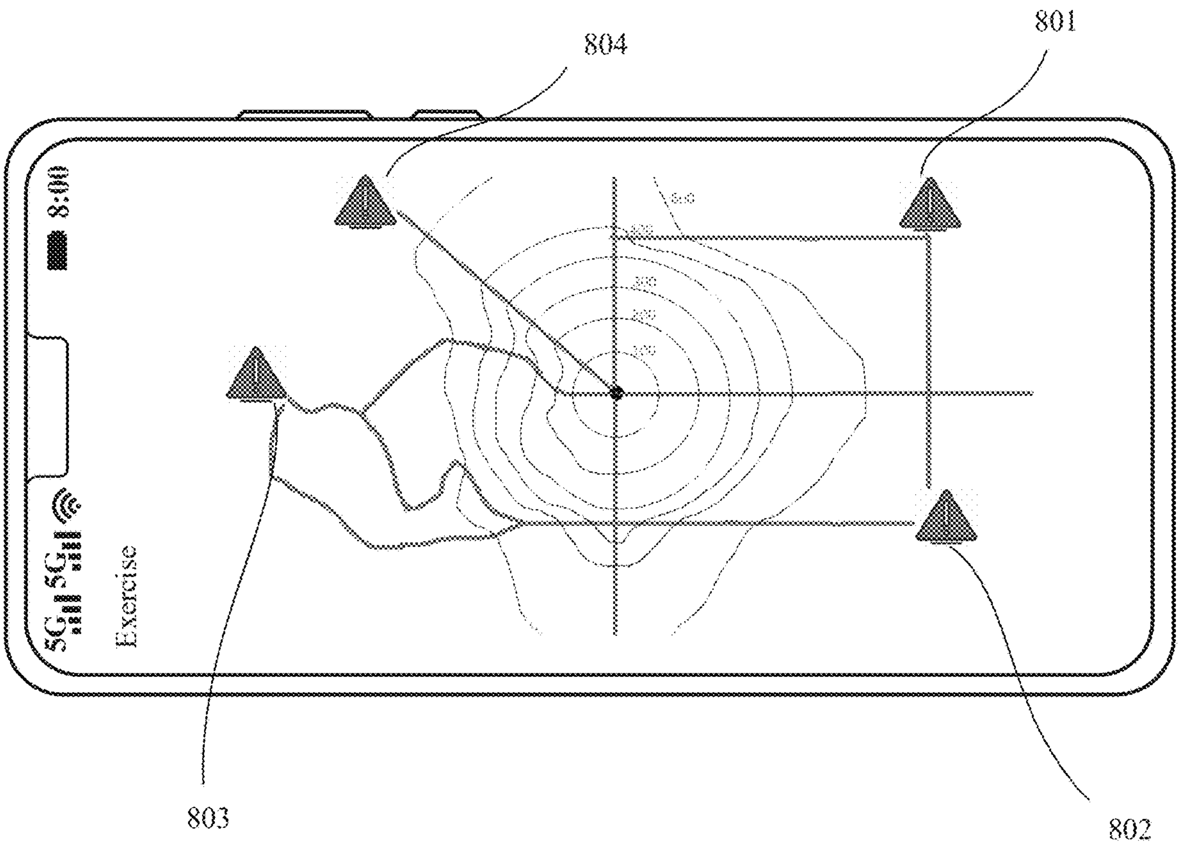
FIG. 8 is a schematic diagram of a display form of a warning icon according to an embodiment of this application.

In some embodiments, the map interface may further display the warning icon and a mark point. The warning icon and the mark point may display the target location in each exercise route or display a region beyond the target location, and may be used to warn the user of excessive exercise beyond the target location in the exercise route. The warning icon may be displayed to remind the user to pay attention to the exercise expenditure during the single exercise or planning of the single exercise, to avoid situations such as exercise injury or harm to health. The warning icon and the mark point may be displayed by using elements such as a color and a symbol. For example, warning icons 801, 802, 803, and 804 shown in FIG. 8 are located at locations at which an exercise expenditure exceeds the maximum expenditure of the single exercise. A specific display manner of the warning icon and the mark point is not limited in this embodiment of this application.

It should be understood that the maximum expenditure of the single exercise is usually not reached by the user during the single exercise. For a location beyond the maximum expenditure, calculation and display are not performed.

Figure 2B:
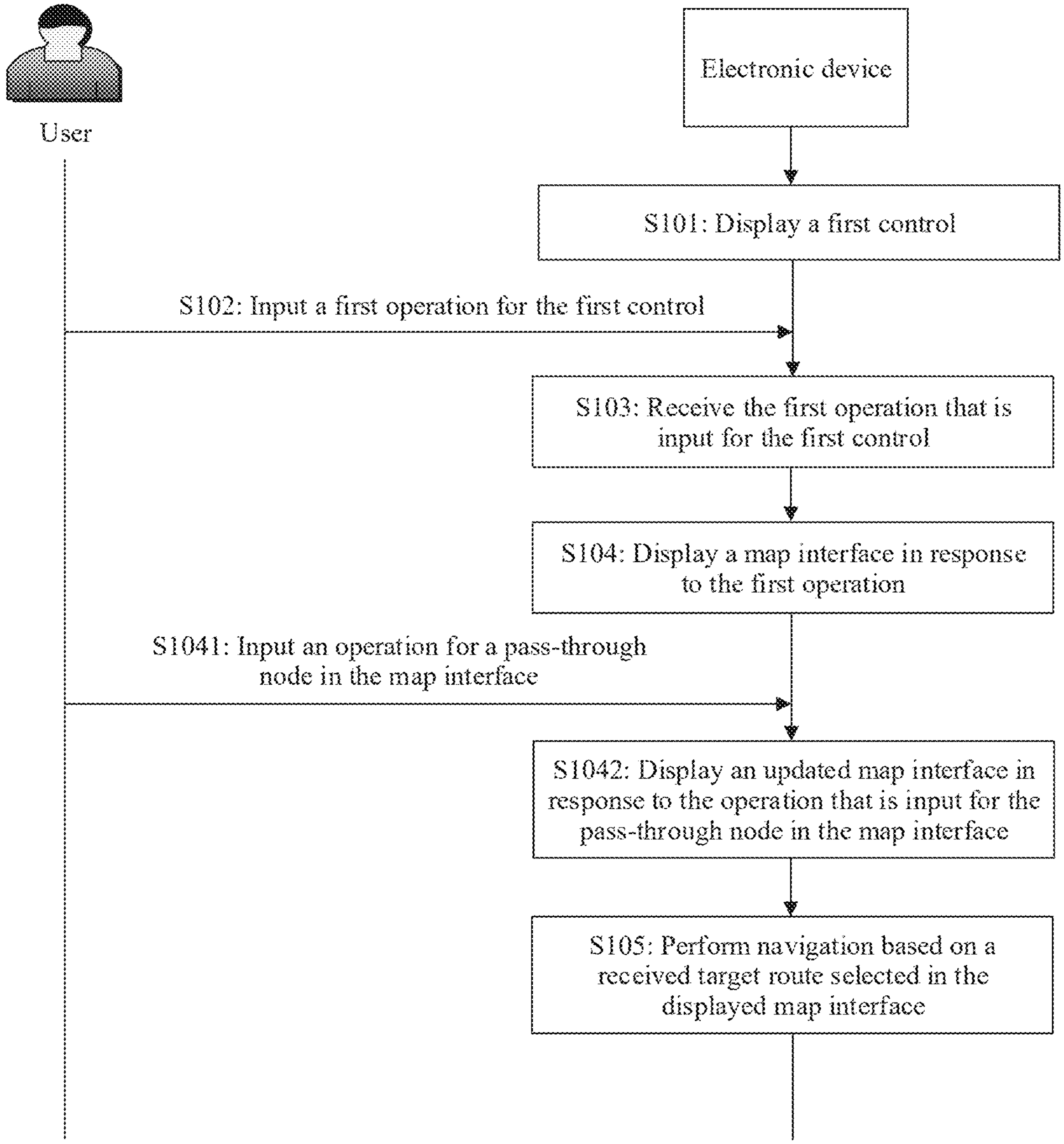
FIG. 2B is a schematic flowchart of a map display method according to an embodiment of this application.

In some embodiments, when planning an exercise route or in an exercise process, the user may select a pass-through node based on requirements. FIG. 2B is a schematic flowchart of another map display method according to an embodiment of this application. After the electronic device displays (S101 to S104) the map interface that includes the exercise route from the starting point to the at least one location, the user may input or select a pass-through node in the map interface. For example, an operation of selecting the pass-through node may be touching a corresponding location in the map interface. For S101 to S104, refer to related descriptions of steps S101 to S104 in FIG. 2A. Details are not described herein again. S1041: The user inputs an operation for the pass-through node in the map interface, and after the electronic device receives the operation of selecting the pass-through node, the electronic device performs S1042, and displays an updated map interface in response to the operation that is input for the pass-through node in the map interface. The updated map interface includes at least one planned target location and one or more exercise routes passing through the pass-through node from the starting point to the target location. The target location is a location that is behind the pass-through node from the starting point and that is determined based on the basic expenditure efficiency of the current exercise of the first object, the maximum expenditure of the single exercise of the user, and map information around the starting point and the pass-through node. The exercise route displays a change of an exercise expenditure passing through the pass-through node from the starting point to the target location. It should be understood that a target location in the updated map interface is an updated location at which the maximum expenditure of the single exercise passing through the pass-through node from the starting point needs to be reached.

In some specific implementations, the exercise route displayed in the updated map interface may display the change of the exercise expenditure passing through the pass-through node from the starting point to the target location. For a display manner of the exercise route, refer to related descriptions in FIG. 4 and FIG. 6. Details are not described herein again.

In some other specific implementations, the updated map interface may further display an equal exercise expenditure line (also referred to as a second equal exercise expenditure line) that uses a pass-through node as a starting point. The exercise expenditure line is a closed curve formed by connecting locations at which exercise expenditures from the pass-through node are the same. In some embodiments, the equal exercise expenditure line may display a value of an exercise expenditure corresponding to the equal exercise expenditure line.

It should be understood that each time after receiving an operation of selecting a pass-through node that is input by the user, the electronic device updates the map interface by using the input pass-through node as a new starting point, and an exercise expenditure at any location in the updated map interface is obtained by adding an exercise expenditure from the original starting point to the pass-through node, so that accumulative calculation of the exercise expenditure is ensured. When the electronic device displays a map interface obtained through a plurality of updates in response to a plurality of input operations of selecting a pass-through node. The map interface obtained through the plurality of updates displays at least one exercise route passing through all input pass-through nodes from the original starting point to the target location, so that planning of a route passing through the pass-through nodes is completed. A control for selecting a target route may be displayed, and is used to prompt the user to select an exercise route.

S105: The electronic device performs navigation based on the received target route selected in the displayed map interface. The process may be as follows: The electronic device receives an operation that is input for a selection control for a route in the map interface, where the selection control is used to select the target route; the electronic device displays the selected target route in response to the operation that is input for the selection control for the route; and further, the electronic device performs navigation based on the target route.

It should be understood that, in some embodiments, when the starting point or an exercise region of the user is in a non-road network environment or an open exercise environment, for example, a square or open water, grid processing may be performed on the non-road network environment, to display the map interface by using the foregoing map display method.

In some embodiments, when detecting that the user deviates from the selected target route in an exercise process, the electronic device may prompt the user, and update the map interface, that is, display a map interface obtained through re-planning from a deviation location of the user.

In some embodiments, the electronic device receives an operation that is input for a round-trip mode control, where a round-trip mode indicates by default a same route back and a same exercise manner back. The electronic device may display the map interface in response to the foregoing operation. The target location is also the starting point. The map interface displays an exercise route from the starting point to a midway point and an exercise route from the midway point to the starting point. The maximum expenditure of the single exercise may be reached in the round-trip exercise route.

In some embodiments, the map interface may further include a route in a driving manner or the like, to combine a travel route and an exercise route.

In some embodiments, the electronic device may update the map interface when detecting that the user changes the exercise type (for example, switching from running to walking, where the process may be detected by a sensor based on an exercise stride length, an exercise speed, and the like of the user). In this case, the exercise expenditure includes an exercise expenditure from the original starting point to a current location.

In some embodiments, the electronic device updates the map interface when detecting that the user inputs an operation of changing the exercise type and a location at which the exercise type is changed.

In the foregoing map display method, the exercise route is used for displaying the change of the exercise expenditure of an exercise from the starting point to the target location, so that the more intuitive exercise route is provided for the user, and the user can be assisted in planning and selecting the exercise route. In addition, the user may add a pass-through node in the map interface by touching or inputting the pass-through node based on requirements, and may update the map interface to display an adjusted exercise route. Both the starting point and the pass-through node may be freely selected. The map display method provides the user with a manner of flexibly planning an exercise route.

The following describes a process in which the electronic device displays the map interface in response to the first operation in S104.

In a specific implementation, the process in which the electronic device displays the map interface in response to the first operation includes determining an exercise expenditure from the starting point to any location around the starting point in the map interface, to determine the target location at which the maximum expenditure of the single exercise is reached. Further, based on the exercise expenditure from the starting point to any location around the starting point in the map interface, the map interface is displayed by using any exercise route display manner (the plurality of display manners described in the first implementation and the second implementation) and the display manner of the equal exercise expenditure line and the warning icon described in S104.

Figure 9:
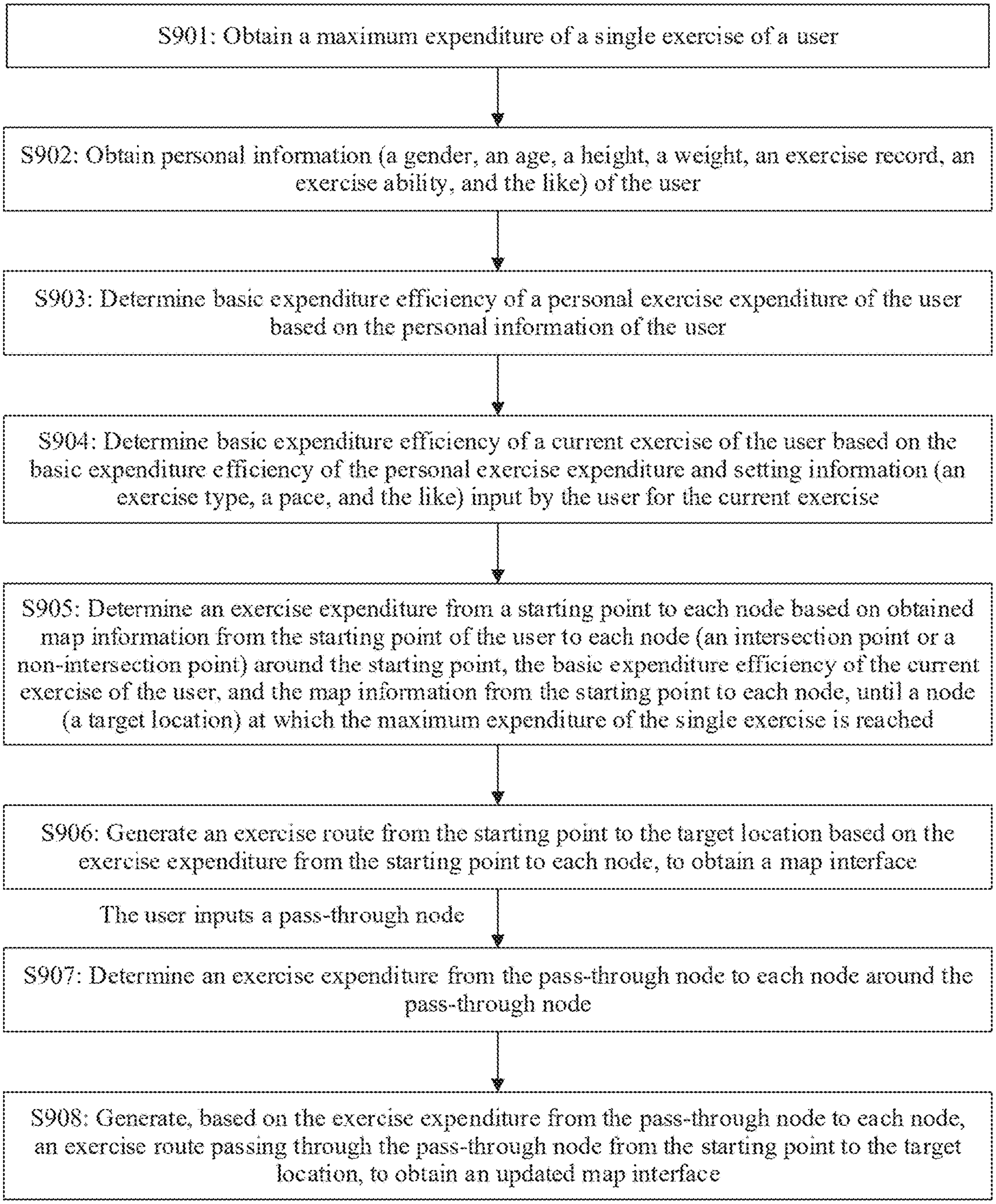
FIG. 9 is a schematic flowchart of displaying a map interface by an electronic device according to an embodiment of this application.

In an implementation, FIG. 9 is a schematic flowchart of displaying the map interface by the electronic device in response to the first operation. The process may include but is not limited to the following steps.

S901: The electronic device obtains the maximum expenditure of the single exercise of the user.

In some embodiments, the electronic device may obtain the maximum expenditure of the single exercise of the user through inputting by the user. For example, the electronic device may display an interface shown in FIG. 10. The interface may include prompt information 1001 of "Input a maximum expenditure of a single exercise", an input box 1002 of the maximum expenditure of the single exercise, and a confirmation control 1003. The user may input the maximum expenditure of the single exercise in the input box 1002 based on the prompt information, so that the electronic device may continue to perform S902 based on the obtained maximum expenditure of the single exercise. The maximum expenditure of the single exercise is usually not reached by a person. The interface shown in FIG. 10 may be displayed after or before the response to the first operation.

Figure 10:
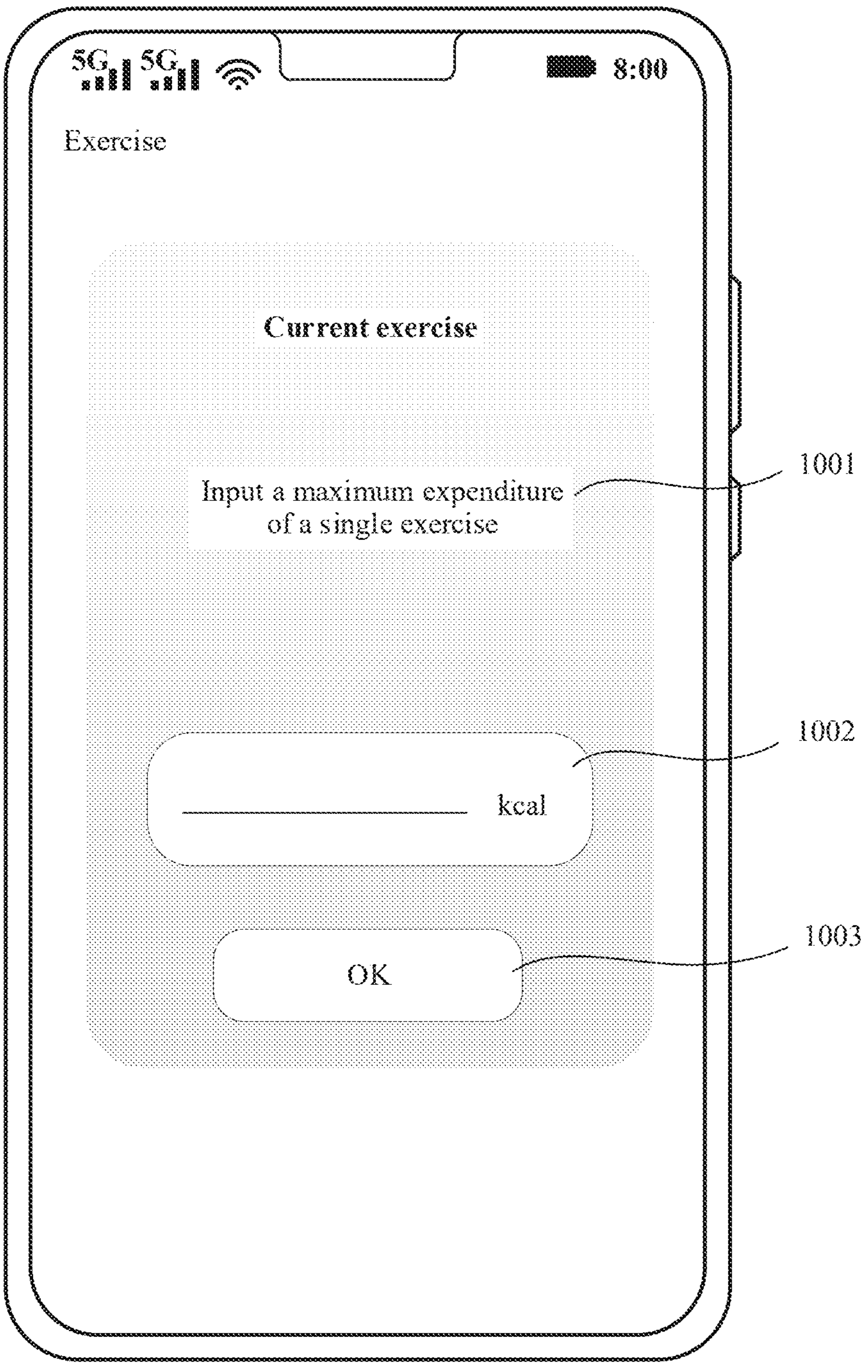
FIG. 10 is a schematic diagram of a display interface according to an embodiment of this application.

In some embodiments, the interface shown in FIG. 10 may be displayed after the response to the first operation. The electronic device displays the interface shown in FIG. 3. The first control is the "Plan a route" control 305. When receiving an operation that is input by the user for the "Plan a route" control 305, the electronic device displays the interface shown in FIG. in response to the operation.

In some other embodiments, the interface shown in FIG. 10 may be displayed before the response to the first operation. The electronic device may display the interface shown in FIG. 10 before displaying the interface shown in FIG. 3. The user may input the maximum expenditure of the current exercise in the input box 1002 of the maximum expenditure of the single exercise in a manner such as a soft keyboard. The electronic device receives an input operation of the user. After receiving the input operation for the confirmation control 1003 shown in FIG. 10, the electronic device displays the interface shown in FIG. 3.

After receiving the operation for the first control, the electronic device performs the following steps.

S902: The electronic device obtains personal information (a gender, an age, a height, a weight, an exercise record, an exercise ability, and the like) of the user. The personal information of the user may be obtained by the electronic device from the Internet or local data. The personal information data of the user may be locally stored or uploaded to a server in the Internet by obtaining an input of the user in the interface 30 shown in FIG. 1. The personal information of the user may be used to evaluate a physical profile of the user.

S903: The electronic device determines basic expenditure efficiency of a personal exercise expenditure of the user based on the personal information of the user.

S904: The electronic device determines basic expenditure efficiency of a current exercise of the user based on the basic expenditure efficiency of the personal exercise expenditure and setting information (an exercise type, a pace, and the like) input by the user for the current exercise.

S905: The electronic device determines an exercise expenditure from the starting point to each node around the starting point based on obtained map information (a distance, a slope degree, a slope distribution, a quantity of intersections, a road surface quality, a current traffic condition, and the like of a route from the starting point to each node), the basic expenditure efficiency of the current exercise of the user, and map information from the starting point to each node, until a node (a target location) at which the maximum expenditure of the single exercise is reached. The node is any location that can be reached from the starting point in the map interface, and includes an intersection point or a non-intersection point.

Specifically, in an implementation of S905, that the electronic device determines the exercise expenditure from the starting point to a plurality of nodes (an intersection point or a non-intersection point) based on the basic expenditure efficiency of the current exercise of the user and the map information around the starting point may include the following steps.

(1) The exercise expenditure of a route is calculated based on an energy expenditure parameter p. The energy expenditure parameter p is:

$$p = \int_{min\theta}^{max\theta} pdf \times k_t(\theta)$$

θ represents a slope angle, pdf is a slope density distribution function, $k_t(\theta)$ represents exercise expenditure efficiency per unit distance at different slope degrees, t is an exercise type, and d is a total distance of the route. The slope angle θ, pdf, and d of the route may be obtained from an electronic map. $k_t(\theta)$ is known data that can be obtained through big data statistics, and represents an exercise expenditure rate of the exercise type t at the slope angle θ. Further, an exercise expenditure Q of the user in the exercise type t in the route is obtained through calculation based on the basic expenditure efficiency of the current exercise obtained in the foregoing S02 to S04 and the energy expenditure parameter p.

Figure 11:
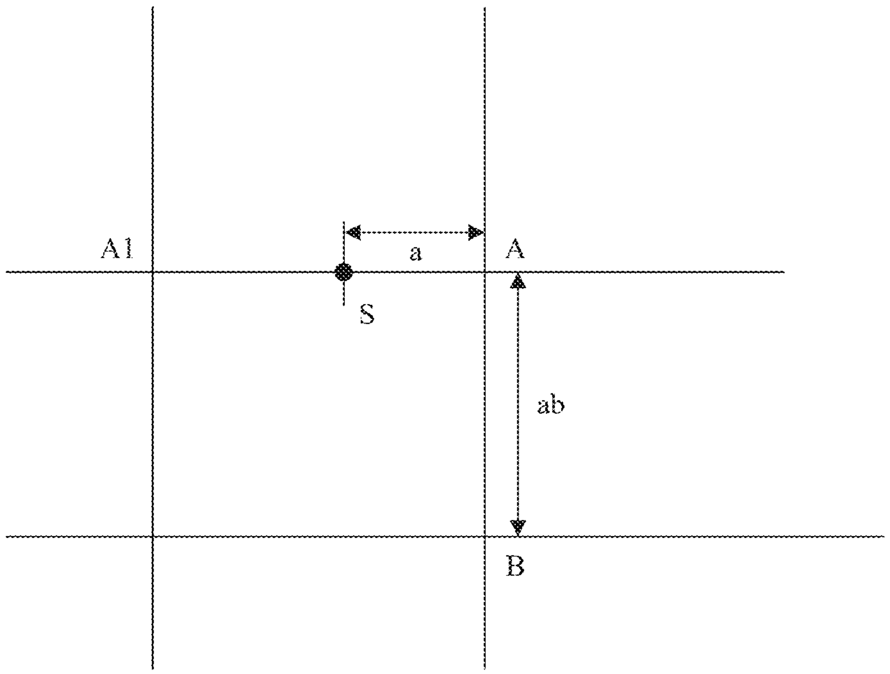
FIG. 11 to FIG. 13 are schematic diagrams of several methods for calculating an exercise expenditure from a starting point to a node according to an embodiment of this application.

(2) An exercise expenditure from the starting point to an adjacent intersection point is calculated by using the method for calculating the exercise expenditure Q in (1). After the exercise expenditure is calculated, the adjacent intersection point of the starting point is referred to as a traversed intersection point. For example, as shown in FIG. 11, the starting point is S, and adjacent intersection points of S are A and A1. Exercise expenditures from S to A and A1 are respectively calculated by using (1). In this case, A and A1 are traversed intersection points. The map information of the starting point to the adjacent intersection point of the starting point may be obtained from the Internet or a local electronic map.

(3) Exercise expenditures of traversed intersection points $A_i$ to adjacent intersection points $B_i$ are calculated in sequence by using a breadth-first search method. If a route from the traversed intersection point $A_i$ to the adjacent intersection point $B_i$ of the traversed intersection point has been traversed in previous calculation, calculation is stopped. If a route from the traversed intersection point $A_i$ to the adjacent intersection point $B_i$ of the traversed intersection point has not been calculated, an exercise expenditure from $A_i$ to $B_i$ is calculated based on whether $B_i$ is a traversed intersection point.

Figure 12:
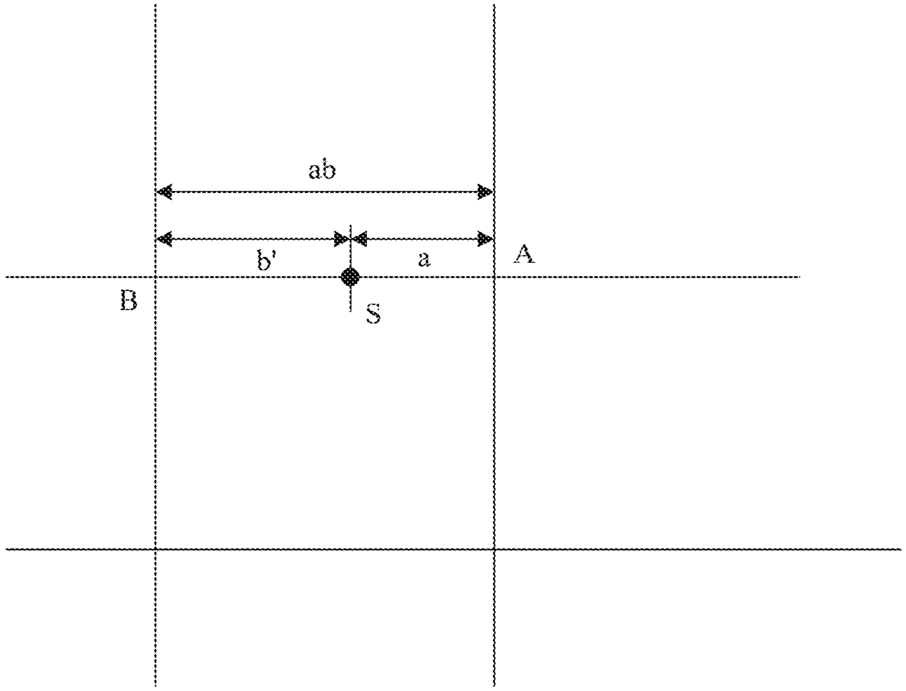

For example, as shown in FIG. 11 and FIG. 12, a traversed intersection point A is used as an example to describe calculation of an exercise expenditure from the traversed intersection point A to an adjacent intersection point B of the traversed intersection point A. As shown in FIG. 11, B is not a traversed intersection point, an exercise expenditure from the starting point S to A is a, an exercise expenditure from A to B is ab, and an exercise expenditure from the starting point S to B is b. In this case, b=a+ab. As shown in FIG. 12, B is a traversed intersection point (A1 in FIG. 11), a calorie expenditure from S to B is b', an exercise expenditure from the starting point S to A is a, an exercise expenditure from A to B is ab, and an exercise expenditure passing through A from the starting point S to B is a+ab. In this case, an exercise expenditure b from the starting point S to B is a smaller value of two routes (S→B and S→A→B). That is, b=min(b', a+ab).

Figure 13:
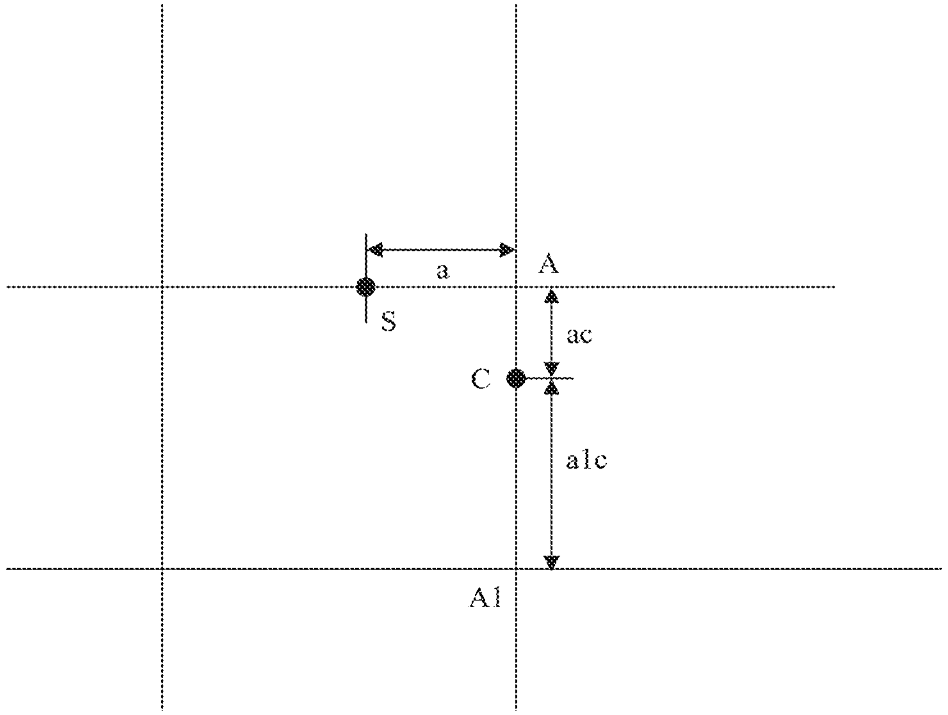

(4) An exercise expenditure from the starting point to a non-intersection point may be calculated based on an exercise expenditure from the non-intersection point to an adjacent intersection point of the non-intersection point and an exercise expenditure from the starting point to the adjacent intersection point of the non-intersection point. One adjacent intersection point of a non-intersection point C is an intersection point A, an exercise expenditure from the starting point S to A is a, and an exercise expenditure from C to A is ac. In this case, an exercise expenditure c from the starting point S to the non-intersection point C may be represented as a+ac. If there are two adjacent intersection points of a non-intersection point C, two different c may be calculated, and a smaller value of the two c is used as an exercise expenditure at C. For example, as shown in FIG. 13, C is a non-intersection point, adjacent intersection points of Care A and A1, an exercise expenditure from the starting point S to A is a, an exercise expenditure from the starting point S to A1 is a1, an exercise expenditure from C to A is ac, and an exercise expenditure from C to A1 is a1c. In this case, an exercise expenditure c from the starting point S to the non-intersection point C may be represented as a+ac (a route S→A→C) or a1+a1c (a route S→A1→C), and c=min(a+ac, a1+a1c).

An intersection point is a real location corresponding to an intersection location in the electronic map, and has a feature of allowing direct advancing in three or more different directions. A non-intersection point is a real location corresponding to a point other than the intersection point in the electronic map interface. An adjacent intersection point of a point is an intersection point that can be reached from the point in a specified exercise type without passing through another intersection point.

(5) The electronic device repeatedly performs the foregoing step (3), and continuously traverses surrounding intersection points, to obtain the exercise expenditure from the starting point to the plurality of nodes (including the intersection point and the non-intersection point). The calculation process described in (3) is not performed for a traversed intersection point beyond the maximum expenditure of the single exercise. When there is no traversed intersection point for which (3) may be performed, calculation is stopped.

It should be understood that, in some embodiments, the exercise environment may alternatively be a non-road network environment, for example, a square or open water. The calculation of the exercise expenditure in the non-road network environment may be grid processing performed on the non-road network environment. Grid processing may be performed on the non-road network environment by using square grids with diagonals or by using a more accurate grid construction method. A grid density depends on data accuracy requirements. Finally, grids are considered as a road network, to calculate the exercise expenditure in (1) to (5).

In the foregoing manner of calculating the exercise expenditure, the electronic device determines the basic expenditure efficiency of the current exercise of the user based on the obtained personal information of the user and the setting information of the current exercise of the user, and then determines the exercise expenditure from the starting point to each node with reference to the energy expenditure parameter p of each route (the route from the starting point to each node), and a plurality of factors that affect the expenditure of the current exercise, for example, personal conditions of the user, such as a gender, an age, a height, a weight, an exercise record, an exercise ability, an exercise skill level, a historical exercise expenditure evaluation value, a recent fatigue degree, and a recent sleep quality, and environment information of an exercise region (near the starting point) of the user, such as a distance, a slope degree, a slope distribution, a road surface quality, and a traffic condition are fully considered. In this way, the exercise expenditure closer to an actual exercise expenditure can be determined, and a calculation result is more accurate. Therefore, the exercise route planning better meets a current situation of the user, and user experience is improved.

It should be noted that the process of calculating, by the electronic device, the exercise expenditure from the starting point to each node described in S905 may be another implementation. For example, an exercise expenditure of an exercise in a route is calculated based on only a length of the route. A manner of calculating the exercise expenditure is not limited in this embodiment of this application.

S906: The electronic device generates the exercise route from the starting point to the target location based on the exercise expenditure from the starting point to each node, to obtain the map interface. S906 may include but is not limited to steps S9061 to S9063.

S9061: The electronic device determines, based on the exercise expenditure from the starting point to each node and the maximum expenditure of the single exercise of the user, at least one target location at which the maximum expenditure of the single exercise from the starting point is reached.

S9062: The electronic device determines one or more exercise routes from the starting point to the at least one target location.

S9063: The electronic device displays the one or more exercise routes in the electronic map. In a specific implementation, the electronic device may add a display layer (namely, the map interface) in the obtained third-party electronic map, to display the map interface for planning the exercise route based on the exercise expenditure from the starting point to the plurality of nodes. For a specific map interface, refer to related descriptions in S104. Details are not described herein again.

In some embodiments, the user selects a pass-through node in the map interface, and the electronic device performs S907 and S908.

S907: The electronic device determines an exercise expenditure from the pass-through node to each node around the pass-through node.

For this process, refer to related descriptions in (1) to (5) in S905. Details are not described herein again. In this case, the electronic device calculates an exercise expenditure of each node around the pass-through node by using the pass-through node as the starting point.

S908: The electronic device generates, based on the exercise expenditure from the pass-through node to each node, an exercise route passing through the pass-through node from the starting point to the target location, to obtain the updated map interface. For this process, refer to related descriptions in S907. Details are not described herein again.

It should be understood that, in some implementations, the maximum expenditure of the single exercise of the user may alternatively be determined by the electronic device based on the obtained personal information (for example, information described in the personal information shown in FIG. 1) of the user and the setting information of the user for the current exercise. The electronic device may determine the maximum expenditure of the single exercise in response to the first operation that is input for the first control.

The following describes, by using two examples, a scenario in which the foregoing map display method is used to plan an exercise route or perform navigation in an exercise process.

Example 1: A user wants to use an electronic device (for example, a smartphone) to perform navigation and complete a target expenditure (1200 kcal) today. In addition, the user wants to go as far as possible, and there is a scenery that is worth watching on a route. The user thinks that if the exercise expenditure exceeds 1500 kcal, excessive fatigue will be caused and an injury risk increases. Therefore, a maximum expenditure of a single exercise is set to 1500 kcal. The user sets an exercise type to running in a setting interface (for example, the interface shown in FIG. 3) of a current exercise of the electronic device, and further inputs an operation for a first control (for example, the route planning control in FIG. 3).

The electronic device receives the operation that is performed by the user for the first control. The electronic device displays a map interface in response to the operation. The map interface displays a plurality of regions with a good scenery, including a mall A, a hill B, and a pond C at which 300, 400, and 500 kcal are respectively consumed for running.

The user selects to go to the hill B first, that is, selects B as a pass-through node. After B is selected, the electronic device displays the map interface by using B as a starting point. The user thinks that it is good experience to run around the hill B. Therefore, the user taps intersection points (namely, a plurality of pass-through nodes) around the hill in sequence to form an exercise route around the hill. Finally, the user returns to the point B. In this case, a total expenditure of 1000 kcal is reached to reach B.

The electronic device then displays an updated map interface by using B as a new starting point. Due to the terrain, only 250 kcal needs to be additionally consumed for returning to the starting point, and 750 kcal needs to be additionally consumed for going to the pond C. If the user goes to C, 1750 kcal is consumed and exceeds the maximum expenditure of the single exercise (1500 kcal). Therefore, a warning icon is displayed at C in the map interface for warning. Finally, the user selects to return to the starting point.

In this way, an exercise route of the starting point-B-a route segment around the hill-B-the starting point is formed. A total expenditure of 1250 kcal is reached. The target expenditure (1200 kcal) today is reached, and the total expenditure does not exceed the maximum expenditure 1500 kcal of the single exercise. Therefore, during running in the exercise route, the risk of injury caused by excessive exercise is reduced.

When designing a running route by using the map display method provided in this embodiment of this application, the user may select an interested location as a pass-through node while obtaining a large amount of calorie expenditure data. With different distinguishing display forms and a representation manner of the equal exercise expenditure line, the user may plan a scientific and interesting exercise route depending on only intuitive preference. The user can design a route by simply selecting a desired location, and can determine whether to start a return trip at any time by viewing an exercise expenditure from a starting point to a current location.

Example 2: A user likes to climb mountains, but cannot complete a large amount of exercise at a time due to muscle problems caused by long-term improper exercise. Doctors believe that it is safe for the user to consume less than 1100 kcal in a single exercise. In other words, a maximum expenditure of a single exercise is 1100 kcal.

The user plans to drive to the foot of a mountain and then climb the mountain on foot. The user first sets a maximum calorie expenditure of a single exercise to 1100 kcal and selects a round-trip mode. The round-trip mode indicates by default a same route back and a same exercise manner back. The electronic device displays a map interface in response to a first operation of the user for a first control. Information that may be obtained from the map interface include three candidate mountain peaks at the location. A peak A has the best scenery, but 1600 kcal needs to be consumed for climbing the top. A peak B is low, and only 700 kcal needs to be consumed for climbing the top. A peak C is high, but cycling is available in some segments. For climbing the top, 600 kcal needs to be consumed for cycling, and 400 kcal needs to be consumed for climbing.

When the user selects the foot of the peak A as a starting point through a touch operation, a warning is displayed in a calorie map because of an excessive expenditure for climbing the top, indicating that top climbing is beyond physical ability.

When the user selects the foot of the peak B as a starting point through a touch operation, top reachability is directly displayed.

When the user selects the foot of the peak C as a starting point through a touch operation, a cycling manner for exercise is selected first, and the end of a cycling ramp of the peak C is tapped as a pass-through node. Then, an exercise type is switched to walking at the end of the cycling ramp of the peak C. In this case, an exercise route based on an exercise expenditure from the foot of the peak C to the top of the mountain is displayed in the map interface. It may be learned from information in the interface that the exercise route may be from the foot of the peak C to the top of the mountain, and the exercise expenditure is within a safe range.

Therefore, by using the foregoing displayed map interface, the user may select from the peak B and the peak C based on exercise requirements, and determine to drive to a travel location.

It may be learned from Example 2 that the map display method provided in this embodiment of this application can assist the user in planning a route, and can also allow the user to freely select a starting point and an exercise type of an exercise, to help the user combine different exercise routes or even driving routes to perform comprehensive travel and exercise route planning. This improves user experience.

The following describes an example electronic device 100 provided in embodiments of this application.

Figure 14:
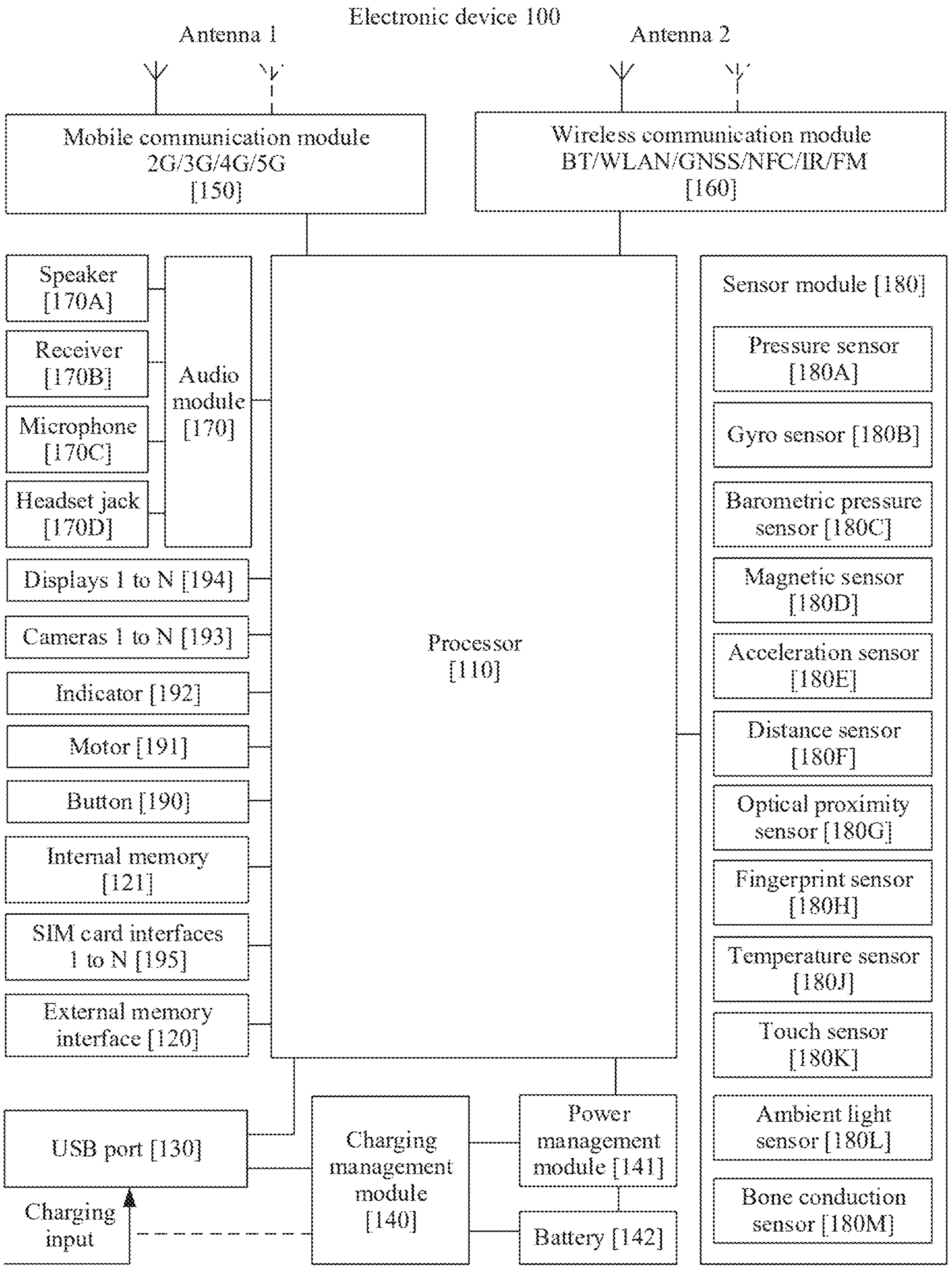
FIG. 14 is a schematic diagram of a structure of an electronic device 100 according to an embodiment of this application.

FIG. 14 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

In this embodiment of this application, the electronic device 100 may process, by using the GPU, a graphic that needs to be displayed in a map interface. For example, by using the several marking methods for displaying a change of an exercise expenditure on the exercise route described in the first implementation and the second implementation in S104, a process of marking the exercise route may be performed by the GPU. For a display form of the exercise route, refer to related descriptions in the first implementation and the second implementation in S104. Details are not described herein again.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, and analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be further configured as the I2C interface, the I2S interface, the UART interface, the MIPI interface, or the like.

The USB port 130 is an interface that conforms to a USB standard specification, and may be specifically a mini USB port, a micro USB port, a USB type-C port, or the like. The USB port 130 may be configured to connect to a charger to charge the electronic device 100, or may be configured to transmit data between the electronic device 100 and a peripheral device, or may be configured to connect to a headset to play audio through the headset. The interface may be further configured to connect to another electronic device such as an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like. The power management module 141 may be further configured to monitor a parameter such as a battery capacity, a battery cycle count, or a battery state of health (electric leakage or impedance). In some other embodiments, the power management module 141 may alternatively be disposed in the processor 110. In some other embodiments, the power management module 141 and the charging management module 140 may alternatively be provided in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diode, QLED), or the like. In some embodiments, the electronic device 100 may include one or N displays 194, where N is a positive integer greater than 1.

In this embodiment of this application, the display displays a map interface generated based on an exercise expenditure. For descriptions of the map interface, refer to the related descriptions in S104 in FIG. 2A. In this way, the map interface can provide a user with a more intuitive exercise expenditure, and help the user plan an exercise route that better meets requirements of the user The electronic device 100 may implement a photographing function through the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU may implement applications such as intelligent cognition of the electronic device 100, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage area may store data (for example, audio data or an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When the electronic device 100 answers a call or receives voice information, the receiver 170B may be placed close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation based on the pressure sensor 180A. The electronic device 100 may also calculate a touch location based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

In this embodiment of this application, the electronic device 100 may perform a related process based on the received touch operation of the user. For example, the user may select a pass-through node in the map interface. A specific operation may be sequentially touching nodes displayed in the map interface as selected pass-through nodes. The electronic device 100 sequentially receives the touch operations, determines a corresponding location of the pass-through node on an electronic map, and updates the map.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may further be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100, and When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED), and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be in contact with a human pulse, to receive a blood pressure beating signal. In some embodiments, the bone conduction sensor 180M may alternatively be disposed in a headset to be combined into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photo taking and audio playing) may correspond to different vibration feedback effect. The motor 191 may also correspond to different vibration feedback effect for touch operations performed on different areas of the display 194. Different application scenarios (for example, a time prompt, information receiving, an alarm clock, and a game) may also correspond to different vibration feedback effect. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network via a SIM card, thereby implementing functions such as making/answering a call and data communication. In some embodiments, the electronic device 100 uses an eSIM, that is, an embedded SIM card. The eSIM card may be embedded into the electronic device 100, and cannot be separated from the electronic device 100.

Figure 15:
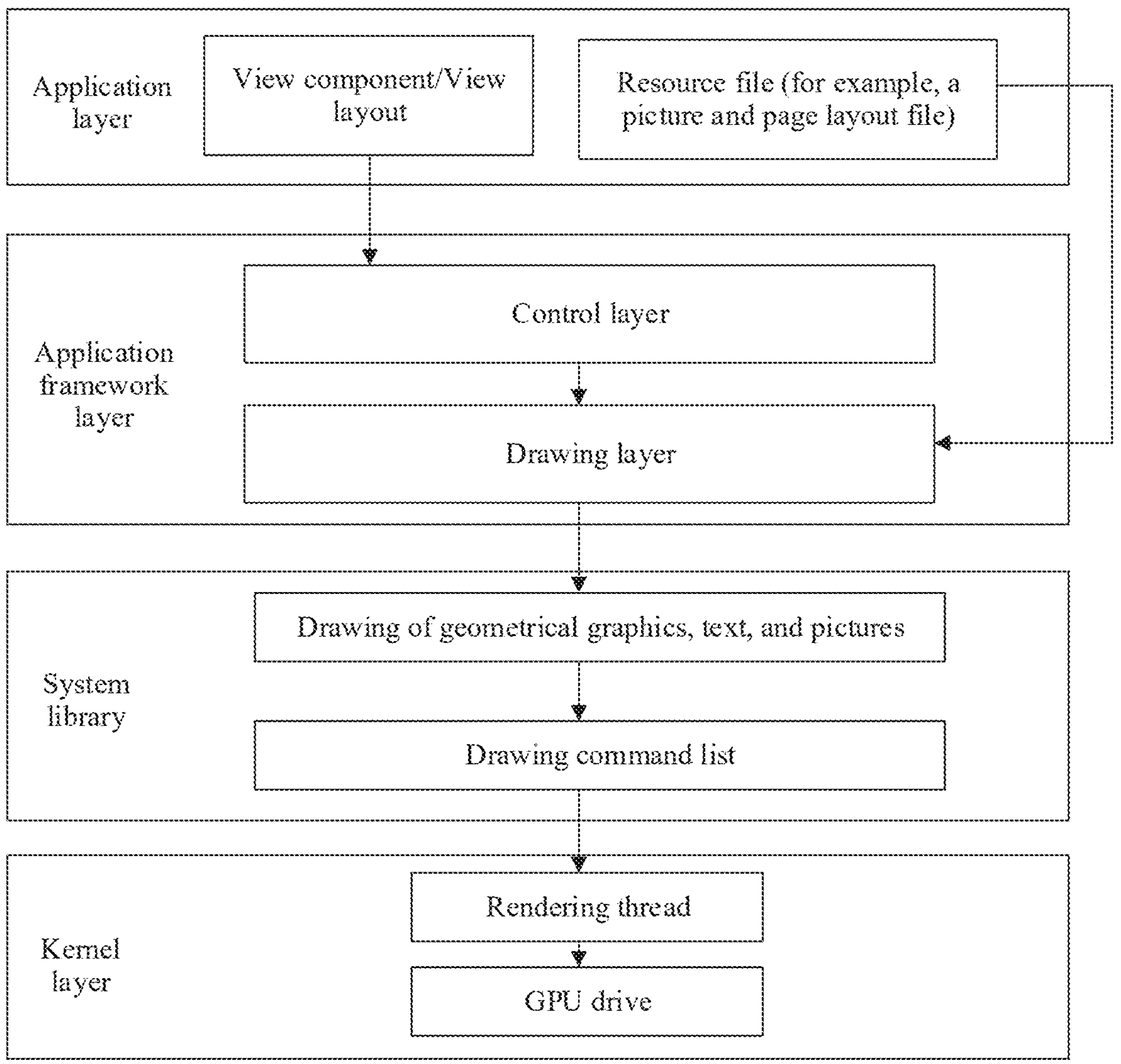
FIG. 15 is a schematic diagram of a software architecture of an electronic device according to an embodiment of this application.

Refer to FIG. 15. FIG. 15 is a software architecture of an electronic device according to an embodiment of this application. The electronic device may perform the map display method described in FIG. 2A or FIG. 2B. As shown in FIG. 15, the following is included.

An application in an application layer may create a user interface by invoking a view (view) interface provided in an application framework. The user interface may be usually parsed into two aspects: a view component/view layout and a resource file. Creating a user interface may include creating an interface element, for example, a control such as an icon or a button list, and setting, by using an XML resource file, a page layout, and a resource such as a picture or a text referenced by the interface element.

An application framework layer may be divided into a control layer and a drawing layer. The framework layer may provide rich and extensible views (view), and the views may be used to construct interface elements such as text boxes and grids in the user interface. The drawing layer may decompose the interface element to be drawn by an upper-layer application into the following or more drawing elements: a geometric graphic, a text, a picture, and the like, determine attributes such as a size, a style, and a color of the drawing elements, and invoke a local service used to draw these drawing elements in a system library.

The system library may provide the local service for drawing the drawing elements, specifically including a local service for drawing a graphic, a local service for drawing a text, a local service for drawing a picture, and the like. In addition, the local service may be further configured to generate a rendering command, and send the rendering command to a render thread at a kernel layer. All drawing commands related to the user interface to be created by the application may be cached in a drawing command list. The drawing commands may be only an object (such as a graphic, a text, or a picture) to be drawn, a color, a style, and the like. In this embodiment of this application, the local service for drawing the drawing elements in the system library may be specifically configured to: after receiving an operation that is input for a "plan a route" control, generate a drawing command sent to the rendering thread at the kernel layer. The drawing command is used to instruct the rendering thread to draw elements (an exercise route, an equal exercise expenditure line, a warning icon, and the like) in the map interface, to generate the map interface based on the exercise expenditure. For a specific display form of the element in the map interface, refer to related descriptions in S104. Details are not described herein again.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

It may be understood that a person of ordinary skill in the art may be aware that, units and algorithm steps in the examples described in embodiments disclosed with reference to embodiments of this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art can understand that functions described with reference to various illustrative logical blocks, modules, and algorithm steps disclosed in embodiments of this application may be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, based on a communication protocol). In this manner, the computer-readable medium may generally correspond to: (1) a non-transitory tangible computer-readable storage medium, or (2) a communication medium, for example, a signal or a carrier. The data storage medium may be any usable medium that can be accessed by one or more computers or one or more processors to retrieve instructions, code, and/or data structures for implementing the technologies described in this application. A computer program product may include a computer-readable medium.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for map displaying, wherein the method comprises:

displaying a first control of a first application, wherein the first control is for triggering map planning based on a first exercise expenditure;

receiving a first operation on the first control; and displaying, in response to the first operation, a map interface comprising at least one target location, one or more first exercise routes from a starting point to each of the at least one target location, a first change of a second exercise expenditure from the starting point to the at least one target location on the one or more first exercise routes, and an equal exercise expenditure line that forms a closed curve by connecting locations at which exercise expenditures from the starting point are the same, wherein the map interface displays a location in a region enclosed by the equal exercise expenditure line and an exercise expenditure range, and wherein the at least one target location is based on a basic expenditure efficiency of a current exercise of a first object, a maximum expenditure of a single exercise of the first object, and first map information around the starting point.

2. The method of claim 1, further comprising dividing, by a processor, each of the one or more first exercise routes into a plurality of route segments, wherein different route segments in a same exercise route correspond to different exercise expenditures.

3. The method of claim 2, further comprising distinguishing, by the processor based on one of a plurality of display forms, the different route segments, wherein the display forms comprise a color, a line type, a pattern, a thickness, a boundary feature, an endpoint shape, a blur degree, or transparency.

4. The method of claim 2, further comprising displaying, by the processor, the same exercise route in a gradient form, wherein the gradient form is a color gradient, and wherein the gradient form is for displaying a second change of a third exercise expenditure.

5. The method of claim 2, further comprising displaying, by the processor, the same exercise route in a gradient form, wherein the gradient form is a transparency gradient.

6. The method of claim 1, wherein after displaying the map interface, the method further comprises:

receiving a second operation for a pass-through node by the first object; and displaying, in response to the second operation, an updated map interface comprising at least one updated target location and one or more second exercise routes passing through the pass-through node from the starting point to the at least one updated target location, wherein the at least one updated target location is behind the pass-through node from the starting point and is based on second map information around the starting point and the pass-through node, and wherein the updated map interface further comprises a second change of a third exercise expenditure passing through the pass-through node from the starting point to the at least one updated target location.

7. The method of claim 6, wherein the updated map interface further comprises an equal exercise expenditure line that forms a closed curve by connecting locations at which exercise expenditures from the pass-through node are the same.

8. The method of claim 1, further comprising displaying a warning icon at the at least one target location in the map interface, wherein the warning icon is for warning the first object of excessive exercise beyond the at least one target location.

9. The method of claim 1, further comprising:

determining, by a processor based on the basic expenditure efficiency and the first map information, exercise expenditures from the starting point to a plurality of nodes;

determining, by the processor based on the exercise expenditures and the maximum expenditure, the at least one target location at which the maximum expenditure is reached; and determining, by the processor, the one or more first exercise routes.

10. The method of claim 9, wherein the first map information comprises a distance, a slope degree, a slope distribution, a road surface quality, and a traffic condition of the one or more first exercise routes from the starting point to the plurality of nodes.

11. The method of claim 1, wherein each of the first exercise expenditure and the second exercise expenditure is measured in any one of a calorie expenditure, a heat expenditure, an energy substance expenditure, a weight loss, a sugar expenditure, a fat expenditure, an exercise amount score, or an exercise task target percentage.

12. The method of claim 1, wherein after displaying the map interface, the method further comprises:

receiving a second operation for a selection control for a target route in the map interface, wherein the selection control is for selecting the target route;

displaying, in response to the second operation, the target route; and performing, based on the target route, navigation.

13. The method of claim 12, further comprising:

detecting that a current location of the first object deviates from the target route; and updating, in response to detecting that the current location deviates from the target route and using the current location as a pass-through node, the map interface.

14. The method of claim 1, wherein before displaying the map interface, the method further comprises receiving, from the first object, the maximum expenditure.

15. An electronic device comprising:

one or more memories configured to store instructions; and one or more processors coupled to the one or more memories and configured to execute the instructions to cause the electronic device to:

display a first control of a first application, wherein the first control is for triggering map planning based on a first exercise expenditure;

receive a first operation on the first control; and display, in response to the first operation, a map interface comprising at least one target location, one or more first exercise routes from a starting point to each of the at least one target location, and a first change of a second exercise expenditure from the starting point to the at least one target location on the one or more first exercise routes, and an equal exercise expenditure line that forms a closed curve by connecting locations at which exercise expenditures from the starting point are the same, wherein the map interface displays a location in a region enclosed by the equal exercise expenditure line and an exercise expenditure range, and wherein the at least one target location is based on a basic expenditure efficiency of a current exercise of a first object, a maximum expenditure of a single exercise of the first object, and first map information around the starting point.

16. The electronic device of claim 15, wherein the one or more processors are further configured to execute the instructions to cause the electronic device to:

receive a second operation for a pass-through node by the first object; and display, in response to the second operation, an updated map interface comprising at least one updated target location and one or more second exercise routes passing through the pass-through node from the starting point to the at least one updated target location, wherein the at least one updated target location is behind the pass-through node from the starting point and is based on second map information around the starting point and the pass-through node, and wherein the updated map interface further comprises a second change of a third exercise expenditure passing through the pass-through node from the starting point to the at least one updated target location.

17. The electronic device of claim 15, wherein the one or more processors are further configured to execute the instructions to cause the electronic device to display a warning icon at the at least one target location in the map interface, and wherein the warning icon is for warning the first object of excessive exercise beyond the at least one target location.

18. The electronic device of claim 15, wherein the one or more processors are further configured to execute the instructions to cause the electronic device to:

receive a second operation for a selection control for a target route in the map interface, wherein the selection control is for selecting the target route;

display, in response to the second operation, the target route; and perform, based on the target route, navigation.

19. The electronic device of claim 15, wherein the one or more processors are further configured to execute the instructions to cause the electronic device to divide each of the one or more first exercise routes into a plurality of route segments, and wherein different route segments in a same exercise route correspond to different exercise expenditures.

20. A computer program product comprising computer-executable instructions that are stored on a non-transitory computer-readable storage medium and that, when executed by one or more processors, cause an electronic device to:

display a control of an application, wherein the control is for triggering map planning based on a first exercise expenditure;

receive an operation on the control; and display, in response to the operation, a map interface comprising at least one target location, one or more exercise routes from a starting point to each of the at least one target location, and a first change of a second exercise expenditure from the starting point to the at least one target location on the one or more first exercise routes, and an equal exercise expenditure line that forms a closed curve by connecting locations at which exercise expenditures from the starting point are the same, wherein the map interface displays a location in a region enclosed by the equal exercise expenditure line and an exercise expenditure range, and wherein the at least one target location is based on a basic expenditure efficiency of a current exercise of an object, a maximum expenditure of a single exercise of the object, and map information around the starting point.

* * * * *